US009239867B2

(12) United States Patent
Guirguis et al.

(10) Patent No.: US 9,239,867 B2
(45) Date of Patent: Jan. 19, 2016

(54) SYSTEM AND METHOD FOR FAST IDENTIFICATION OF VARIABLE ROLES DURING INITIAL DATA EXPLORATION

(71) Applicant: SAS Institute Inc., Cary, NC (US)

(72) Inventors: Georges H. Guirguis, Cary, NC (US); Scott Pope, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 14/536,829

(22) Filed: Nov. 10, 2014

(65) Prior Publication Data

US 2015/0081735 A1 Mar. 19, 2015

Related U.S. Application Data

(63) Continuation-in-part of application No. 13/772,404, filed on Feb. 21, 2013, now Pat. No. 8,918,410.

(51) Int. Cl.
G06F 17/30 (2006.01)
G06Q 10/06 (2012.01)

(52) U.S. Cl.
CPC .......... G06F 17/30539 (2013.01); G06Q 10/06 (2013.01)

(58) Field of Classification Search
CPC ................ G06F 17/30386; G06F 17/30424; G06F 17/30241; G06F 17/30864; G06F 17/30867; G06F 17/30011
See application file for complete search history.

(56) References Cited

U.S. PATENT DOCUMENTS

2014/0237001 A1 1/2014 Guirguis et al.

OTHER PUBLICATIONS

G. Williams, Rattle: A Data Mining GUI for R, The R Jounal vol. 1/2, ISSN 2073-4859, Dec. 2009, pp. 45-55.
The Basics of SAS Enterprise Miner 5.2, undated, pp. 1-46.

Primary Examiner — Truong Vo
(74) Attorney, Agent, or Firm — Bell & Manning, LLC

(57) ABSTRACT

Systems and methods are provided for identifying data variable roles during initial data exploration. A variable type, unique data value count values, and an overflow count value are determined for a variable. The unique data value count values include a number of occurrences of each of a plurality of unique data values for the variable in a data set. The overflow count value is a number of occurrences of data values other than the plurality of unique data values for the variable in the data set. When a number of the plurality of unique data values is greater than a value for a high cardinality threshold, the variable is determined to be a high cardinality variable. When the variable is not determined to be the high cardinality variable, a class variable role is assigned to the variable. When the variable is determined to be the high cardinality variable, Whether or not the variable is a numeric variable type is determined based on the determined variable type. When the variable is determined to not be the numeric variable type, the overflow count value is compared to the unique data value count values to determine whether or not rare visible values occurred for the variable. When the determination is that rare visible values occurred for the variable, a record identifier variable role is assigned to the variable.

33 Claims, 21 Drawing Sheets

| TABLE 1 WORKER1 DATA | |
|---|---|
| C1 | N1 |
| 1 | 21.2 |
| 2 | 65.3 |
| 1 | 17.3 |
| 3 | 51 |
| 1 | 29.9 |
| 2 | 38.6 |

| TABLE 2 WORKER2 DATA | |
|---|---|
| C1 | N1 |
| 1 | 9.8 |
| 1 | 30.3 |
| 2 | 72.1 |
| 3 | 60.5 |
| 1 | 35.2 |
| 2 | 2.1 |

Fig. 13

WORKER1 OBSERVATIONS

1

| C1 | VAL: 1 | N1 | VAL: 21.2 |
|---|---|---|---|
| LEVEL | FREQ | LEVEL | FREQ |
| 1 | 1 | 21.2 | 1 |
|  |  |  |  |
|  |  |  |  |
| OTHER | 0 | OTHER | 0 |

2

| C1 | VAL: 2 | N1 | VAL: 65.3 |
|---|---|---|---|
| LEVEL | FREQ | LEVEL | FREQ |
| 1 | 1 | 21.2 | 1 |
| 2 | 1 | 65.3 | 1 |
|  |  |  |  |
| OTHER | 0 | OTHER | 0 |

3

| C1 | VAL: 1 | N1 | VAL: 17.3 |
|---|---|---|---|
| LEVEL | FREQ | LEVEL | FREQ |
| 1 | 2 | 17.3 | 1 |
| 2 | 1 | 21.2 | 1 |
|  |  | 65.3 | 1 |
| OTHER | 0 | OTHER | 0 |

WORKER2 OBSERVATIONS

| C1 | VAL: 1 | N1 | VAL: 9.8 |
|---|---|---|---|
| LEVEL | FREQ | LEVEL | FREQ |
| 1 | 1 | 9.8 | 1 |
|  |  |  |  |
|  |  |  |  |
| OTHER | 0 | OTHER | 0 |

| C1 | VAL: 1 | N1 | VAL: 30.3 |
|---|---|---|---|
| LEVEL | FREQ | LEVEL | FREQ |
| 1 | 2 | 9.8 | 1 |
|  |  | 30.3 | 1 |
|  |  |  |  |
| OTHER | 0 | OTHER | 0 |

| C1 | VAL: 2 | N1 | VAL: 72.1 |
|---|---|---|---|
| LEVEL | FREQ | LEVEL | FREQ |
| 1 | 2 | 9.8 | 1 |
| 2 | 1 | 30.3 | 1 |
|  |  | 72.1 | 1 |
| OTHER | 0 | OTHER | 0 |

Fig. 14A

| | C1 | VAL: 3 | N1 | VAL: 51 | | C1 | VAL: 3 | N1 | VAL: 60.5 |
|---|---|---|---|---|---|---|---|---|---|
| | LEVEL | FREQ | VALUE | FREQ | | LEVEL | FREQ | LEVEL | FREQ |
| | 1 | 2 | 17.3 | 1 | | 1 | 2 | 9.8 | 1 |
| 4 | 2 | 1 | 21.2 | 1 | | 2 | 1 | 30.3 | 1 |
| | 3 | 1 | 51 | 1 | | 3 | 1 | 60.5 | 1 |
| | | | 65.3 | 1 | | | | 72.1 | 1 |
| | OTHER | 0 | OTHER | 0 | | OTHER | 0 | OTHER | 0 |

| | C1 | VAL: 1 | N1 | VAL: 29.9 | | C1 | VAL: 1 | N1 | VAL: 35.2 |
|---|---|---|---|---|---|---|---|---|---|
| | LEVEL | FREQ | VALUE | FREQ | | LEVEL | FREQ | LEVEL | FREQ |
| | 1 | 3 | 17.3 | 1 | | 1 | 3 | 9.8 | 1 |
| 5 | 2 | 1 | 21.2 | 1 | | 2 | 1 | 30.3 | 1 |
| | 3 | 1 | 29.9 | 1 | | 3 | 1 | 35.2 | 1 |
| | | | 51 | 1 | | | | 60.5 | 1 |
| | OTHER | 0 | OTHER | 1 | | OTHER | 0 | OTHER | 1 |

| | C1 | VAL: 1 | N1 | VAL: 29.9 | | C1 | VAL: 1 | N1 | VAL: 35.2 |
|---|---|---|---|---|---|---|---|---|---|
| | LEVEL | FREQ | VALUE | FREQ | | LEVEL | FREQ | LEVEL | FREQ |
| | 1 | 3 | 17.3 | 1 | | 1 | 3 | 9.8 | 1 |
| 5P | 2 | 1 | 21.2 | 1 | | 2 | 1 | 30.3 | 1 |
| | 3 | 1 | 29.9 | 1 | | 3 | 1 | 35.2 | 1 |
| | | | 51 | 1 | | | | | |
| | OTHER | 0 | OTHER | 1 | | OTHER | 0 | OTHER | 2 |

| | C1 | VAL: 2 | N1 | VAL: 38.6 | | C1 | VAL: 2 | N1 | VAL: 2.1 |
|---|---|---|---|---|---|---|---|---|---|
| | LEVEL | FREQ | VALUE | FREQ | | LEVEL | FREQ | LEVEL | FREQ |
| | 1 | 3 | 17.3 | 1 | | 1 | 3 | 2.1 | 1 |
| 6 | 2 | 2 | 21.2 | 1 | | 2 | 2 | 9.8 | 1 |
| | 3 | 1 | 29.9 | 1 | | 3 | 1 | 30.3 | 1 |
| | | | 38.6 | 1 | | | | 35.2 | 1 |
| | OTHER | 0 | OTHER | 2 | | OTHER | 0 | OTHER | 2 |

Fig. 14B

WORKER1 LEVELS

| C1 | | N1 | |
|---|---|---|---|
| LEVEL | FREQ | LEVEL | FREQ |
| 1 | 3 | 17.3 | 1 |
| 2 | 2 | 21.2 | 1 |
| 3 | 1 | 29.9 | 1 |
| | | | |
| OTHER | 0 | OTHER | 3 |

WORKER2 LEVELS

| C1 | | N1 | |
|---|---|---|---|
| LEVEL | FREQ | LEVEL | FREQ |
| 1 | 3 | 2.1 | 1 |
| 2 | 2 | 9.8 | 1 |
| 3 | 1 | 30.3 | 1 |
| | | 35.2 | 1 |
| OTHER | 0 | OTHER | 2 |

Fig. 15

C1 — WORKER1 LEVELS

| DATA VALUE | FREQUENCY |
|---|---|
| 1 | 3 |
| 2 | 2 |
| 3 | 1 |
| | |
| OTHER | 0 |

C1 — WORKER2 LEVELS

| DATA VALUE | FREQUENCY |
|---|---|
| 1 | 3 |
| 2 | 2 |
| 3 | 1 |
| | |
| OTHER | 0 |

C1 — COMBINED LEVELS

| DATA VALUE | FREQUENCY |
|---|---|
| 1 | 6 |
| 2 | 4 |
| 3 | 2 |
| | |
| OTHER | 0 |

| WORKER1 | |
|---|---|
| LEVEL | FREQUENCY |
| 17.3 | 1 |
| 21.2 | 1 |
| 29.9 | 1 |
|  |  |
| OTHER | 3 |

N1

| WORKER2 | |
|---|---|
| LEVEL | FREQUENCY |
| 2.1 | 1 |
| 9.8 | 1 |
| 30.3 | 1 |
| 35.2 | 1 |
| OTHER | 2 |

| WORKER1 LEVELS | |
|---|---|
| DATA VALUE | FREQUENCY |
|  |  |
| 21.2 | 1 |
| 29.9 | 1 |
|  |  |
| OTHER | 3 |

N1

| MERGED LEVELS | VAL: 21.2 FREQ:1 |
|---|---|
| LEVEL | FREQUENCY |
| 2.1 | 1 |
| 9.8 | 1 |
| 17.3 | 1 |
| 30.3 | 1 |
| OTHER | 3 |

| WORKER1 LEVELS | |
|---|---|
| DATA VALUE | FREQUENCY |
|  |  |
|  |  |
| 29.9 | 1 |
|  |  |
| OTHER | 3 |

N1

| MERGED LEVELS | VAL: 21.2 FREQ:1 |
|---|---|
| LEVEL | FREQUENCY |
| 2.1 | 1 |
| 9.8 | 1 |
| 17.3 | 1 |
| 21.2 | 1 |
| OTHER | 4 |

Fig. 17C

| N1 | |
|---|---|
| WORKER1 | |
| LEVEL | FREQUENCY |
|  |  |
|  |  |
|  |  |
|  |  |
| OTHER | 3 |

| N1 | |
|---|---|
| MERGED LEVELS | VAL: 29.9 FREQ:1 |
| LEVEL | FREQUENCY |
| 2.1 | 1 |
| 9.8 | 1 |
| 17.3 | 1 |
| 21.2 | 1 |
| OTHER | 5 |

Fig. 17D

| N1 | |
|---|---|
| WORKER1 | |
| LEVEL | FREQUENCY |
|  |  |
|  |  |
|  |  |
|  |  |
| OTHER |  |

| N1 | |
|---|---|
| MERGED LEVELS | VAL: OTHER FREQ:3 |
| LEVEL | FREQUENCY |
| 2.1 | 1 |
| 9.8 | 1 |
| 17.3 | 1 |
| 21.2 | 1 |
| OTHER | 8 |

Fig. 17E

SYSTEM AND METHOD FOR FAST IDENTIFICATION OF VARIABLE ROLES DURING INITIAL DATA EXPLORATION

CROSS-REFERENCE TO RELATED APPLICATIONS

The present application is a continuation-in-part of U.S. patent application Ser. No. 13/772,404, filed on Feb. 21, 2013, the entire contents of which are hereby incorporated by reference.

TECHNICAL FIELD

The technology described herein relates generally to computer-implemented systems and methods for data mining, and in particular, to computer implemented systems and methods for initial data exploration before the start of data analysis.

BACKGROUND

Data mining can be used in various fields. Data mining may reveal information and insight into a data set.

SUMMARY

In accordance with the teachings provided herein, systems and methods are provided for identifying data variable roles during initial data exploration. In one example, a computer-implemented method of determining a role for a data variable for use in data modeling of a physical process is disclosed. The method comprises identifying to a plurality of data nodes a set of data records containing data values assigned to each data node, a maximum number of levels to record in a sorted data structure at the data nodes, and the data node responsible for each of a plurality of variables. The method further comprises receiving for each variable from the data node responsible for the variable a plurality of unique data values for the variable, a count for each of the unique data values and an overflow count for the variable, wherein the number of unique data values does not exceed the maximum number of levels. The data values, counts and overflow count having been generated at a plurality of data nodes by node data processors configured by data processing instructions to determine whether a next data value for a data record can be added to the sorted data structure at the data node and that a count associated with that next data value can be added to the sorted data structure when the next data value can be added, determine whether the next data value is already included in the sorted data structure and that the count associated with that next data value can be incremented when the next data value is already included, and determine whether the next data value should not be added to the data structure and that an overflow count at that node should be incremented when the next data value cannot be added. A role for a variable can be determined based upon the unique data values, counts and overflow count for the variable.

In another example, a computer-implemented system for determining a role for a data variable for use in data modeling of a physical process is provided. The system comprises a plurality of data nodes each comprising a node data processor configured to perform operations on a plurality of data records. Each data record includes a data value for a variable. The plurality of data nodes include non-transitory computer-readable media encoded with a sorted data structure and encoded with data processing instructions. The sorted data structure is provided for storing up to a predetermined number of unique data values for one or more variables, a count for each of the unique data values, and an overflow count for each of the one or more variables. The data processing instructions comprise instructions for configuring the data node to determine whether a next data value can be added to the sorted data structure at the data node and that a count associated with that next data value can be added to the sorted data structure when the next data value can be added, determine whether the next data value is already included in the sorted data structure and that the count associated with that next data value can be incremented when the next data value is already included, and determine whether the next data value should not be added to the data structure and that an overflow count at that node should be incremented when the next data value cannot be added. One of the data nodes is a root data node comprising a root data processor configured by instructions to communicate data record assignments to the data nodes and a maximum number of levels to record in the sorted data structure. The root data processor is also configured to receive for a plurality of variables a plurality of unique data values, a count for each of the unique data values and an overflow count for the variables. A role for a variable can be determined based upon the unique data values, counts and overflow count for the variable.

In yet another example, a computer-program product for performing data mining operations on data is provided. The computer-program product is tangibly embodied in a machine-readable non-transitory storage medium and includes instructions configured to cause a data processing apparatus to identify to a plurality of node data processors a set of data records containing data values, wherein a particular node data processor is assigned a particular set of data records. At the particular node data processor, the instructions are configured to cause a data processing apparatus to determine whether a data value for a next data record in the particular set of data records can be added to a sorted data structure at the particular node data processor, wherein the particular node data processor is configured for each variable to store up to a predetermined number of unique data values in the sorted data structure and a count for each of the unique data values, and wherein the particular node data processor is configured to store an overflow count of data values that cannot be added to the sorted data structure. The instructions are further configured to cause a data processing apparatus to increment the count associated with that data value when the data value can be added and the data value matches a data value in the sorted data structure, add the data value to the sorted data structure when the data value can be added and the data value does not match a data value in the sorted data structure, and increment the overflow count when the data value cannot be added. The instructions are further configured to cause a data processing apparatus to consolidate the data values and counts for each variable from the particular node data processor with data values and counts from other of the plurality of node data processors into a sorted consolidated data structure. A role for a variable can be determined based upon the unique data values, counts and overflow count for a variable.

In another example, a computer-implemented method of determining a role for a data variable for use in data modeling of a physical process is provided. The method comprises receiving the identity of a set of data records containing data values and a maximum number of levels to record in a sorted data structure, determining for a data variable whether a next data value for a data record can be added to the sorted data structure and that a count associated with that next data value can be added to the sorted data structure when the next data value can be added, determining for the data variable whether the next data value is already included in the sorted data structure and that the count associated with that next data value can be incremented when the next data value is already included, and determining for the data variable whether the next data value should not be added to the data structure and that an overflow count should be incremented when the next data value cannot be added. The method further comprises broadcasting for the data variable a plurality of unique data values, a count for each of the unique data values and an overflow count, wherein the number of unique data values does not exceed the maximum number of levels. A role for the variable can be determined based upon the unique data values, counts and overflow count.

In yet another example, a computer-implemented method for identifying data variable roles is provided. A variable type, unique data value count values, and an overflow count value are determined for a variable. The unique data value count values include a number of occurrences of each of a plurality of unique data values for the variable in a data set. The overflow count value is a number of occurrences of data values other than the plurality of unique data values for the variable in the data set. Determine that the variable is a high cardinality variable when a number of the plurality of unique data values is greater than a value for a high cardinality threshold, or determine that the variable is not a high cardinality variable when a number of the plurality of unique data values is less than a value for a high cardinality threshold. When the variable is determined to not be the high cardinality variable, a class variable role is assigned to the variable, or, when the variable is determined to be the high cardinality variable, whether or not the variable is a numeric variable type is determined based on the determined variable type. When the variable is determined to not be the numeric variable type, the overflow count value is compared to the unique data value count values to determine whether or not rare visible values occurred for the variable. When the determination is that rare visible values occurred for the variable, a record identifier variable role is assigned to the variable.

In yet another example, a computer-program product is provided. The computer-program product is tangibly embodied in a machine-readable non-transitory storage medium and includes instructions configured to perform the computer-implemented method for identifying data variable roles.

In yet another example, a computer-implemented system is provided. The system includes a processor and a non-transitory computer-readable medium encoded with data processing instructions comprising instructions for configuring the processor to perform the computer-implemented method for identifying data variable roles.

BRIEF DESCRIPTION OF THE DRAWINGS

FIG. 13 contains two example tables that, respectively, show the observations that are assigned to example compute node 1 and example compute node 2 for a data table with two variables, C1 and N1.

FIGS. 14a and 14b contain a collection of example tables that show the state of observed levels recorded in the binary trees after each observation is processed.

FIG. 15 contains two example tables that, respectively, show the final level lists for the two example worker nodes after all of the example observations have been processed.

FIG. 16 contains a collection of tables that illustrate the merging of the values for variable C1.

FIGS. 17A-17E contains a collection of tables that illustrate the merging of the values for variable N1. In particular, FIG. 17A illustrates the merger of level 17.3 from Worker 1 with the Worker 2 table. FIG. 17B illustrates the merger of level 21.2 from Worker 1 with the Worker 2 table. FIG. 17C illustrates the merger of level 29.2 from Worker 1 with the Worker 2 table. FIG. 17D illustrates the merger of the Other data from Worker 1 with the Other data in the Worker 2 table. And, the final tables in FIG. 17E illustrate the final result after the data merge is complete.

DETAILED DESCRIPTION

Figure 1:
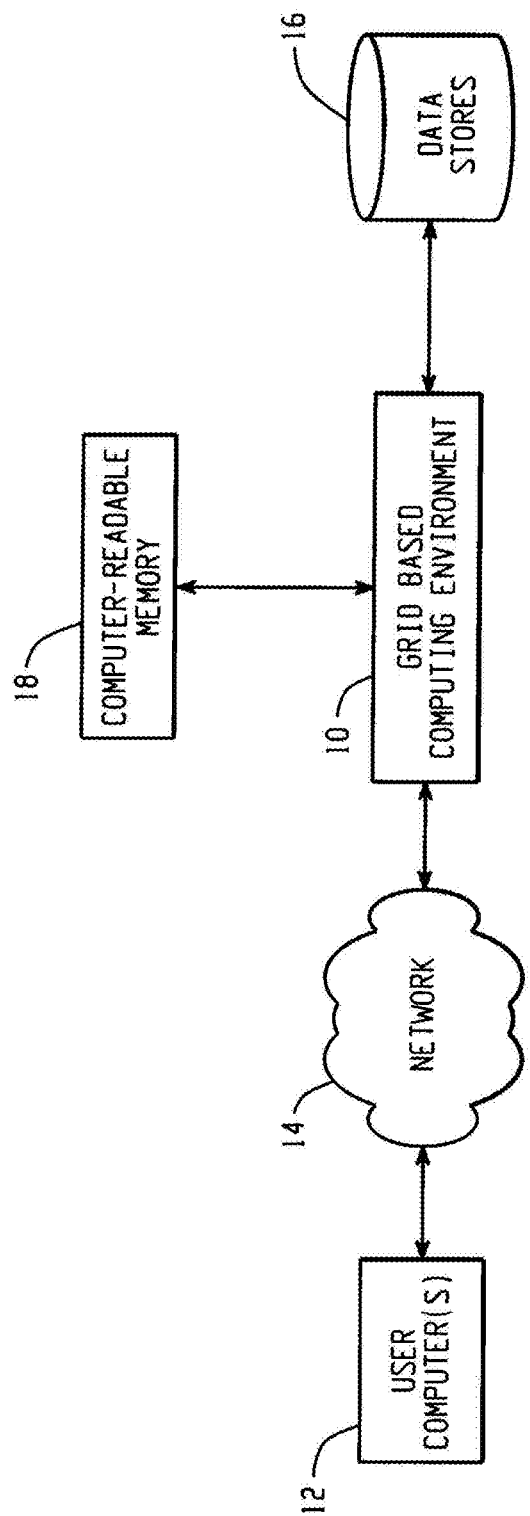
FIG. 1 is a block diagram depicting an example environment wherein users can interact with a computing environment that can perform data mining operations.

FIG. 1 depicts at 10 a computing environment for processing data for many different types of applications, such as for scientific, technical or business applications. One or more user computers 12 can interact with the computing environment 10 through a number of ways, including a network 14. The computing environment 10 illustrated is a grid-based computing environment that includes multiple compute nodes, each containing one or more servers or data processors (not shown). However, a grid-based computing environment may not be required. One or more data stores 16 may be coupled to the computing environment 10 to store data to be processed in the computing environment 10 as well as to store any intermediate or final data generated by the computing environment. Computer-readable memory 18 may also be coupled to the computing environment 10 for use by the data processors when processing data. An example application for the computing environment 10 involves the performance of data mining, in general, and initial data exploration before the start of data analysis, in particular.

Figure 2:
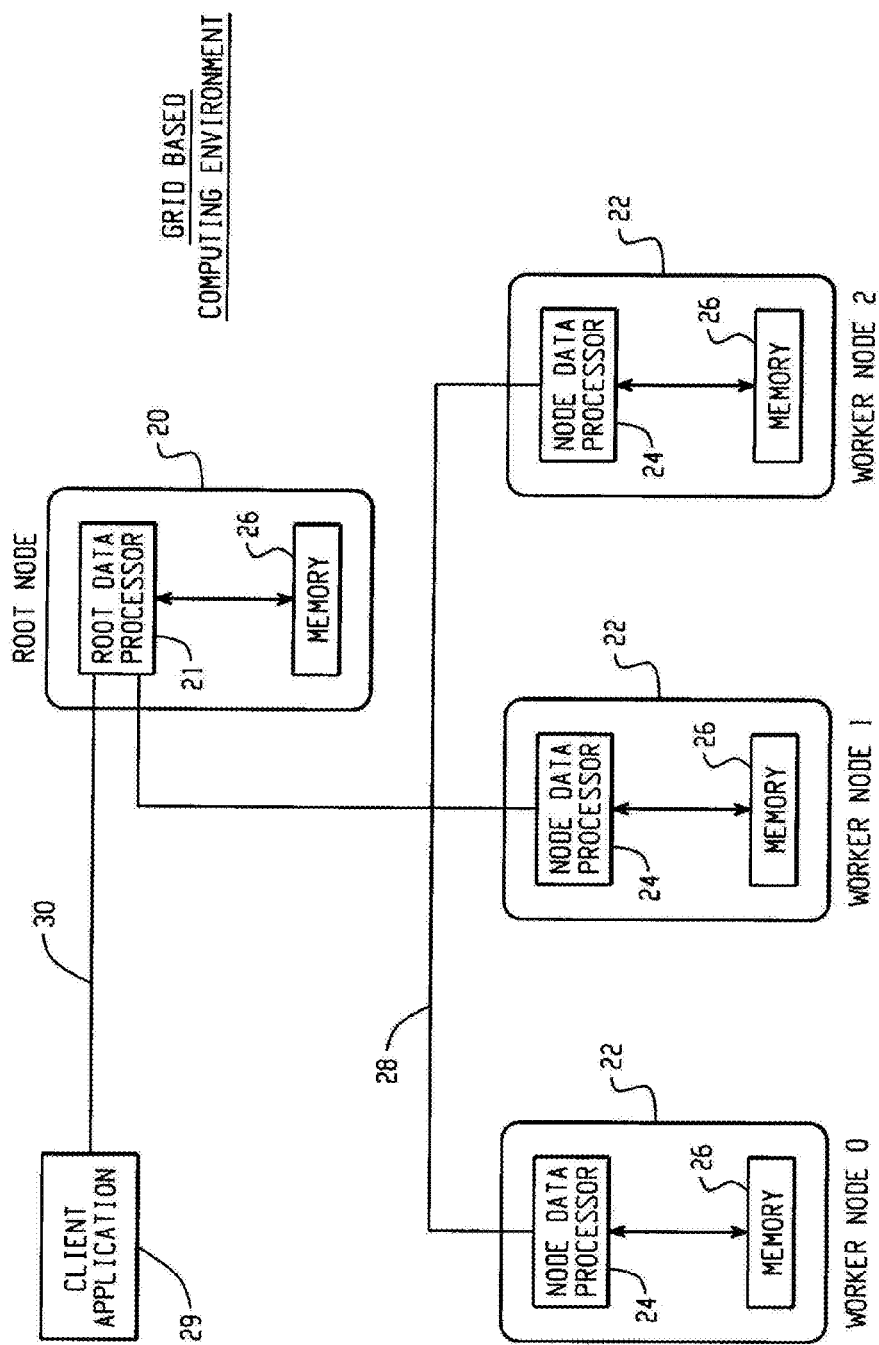
FIG. 2 is a block diagram depicting an example grid-based computing environment that can perform data mining operations.

FIG. 2 illustrates hardware components for an example grid-based computing system 10, which is the computing environment 10 in FIG. 1. The grid-based computing system 10 includes a number of data processing nodes 20, 22 comprising multi-core data processors 21, 24 in this example. One of the nodes is designated a control or root data processing node 20 and a plurality of the nodes are designated as worker data processing nodes 22. Each data processing node 20, 22 may include computer-readable memory 26 that is accessible to the data processor associated with that node.

The various data processing nodes 20, 22 are connected via a network 28 and can communicate with each other using a predetermined communication protocol such as the Message Passing Interface (MPI). The root data processor 21 at the control node 20 can communicate with a client application 29 over a communication path 30 to receive ad hoc queries from a user and to respond to those ad hoc queries after processing data.

Figure 3:
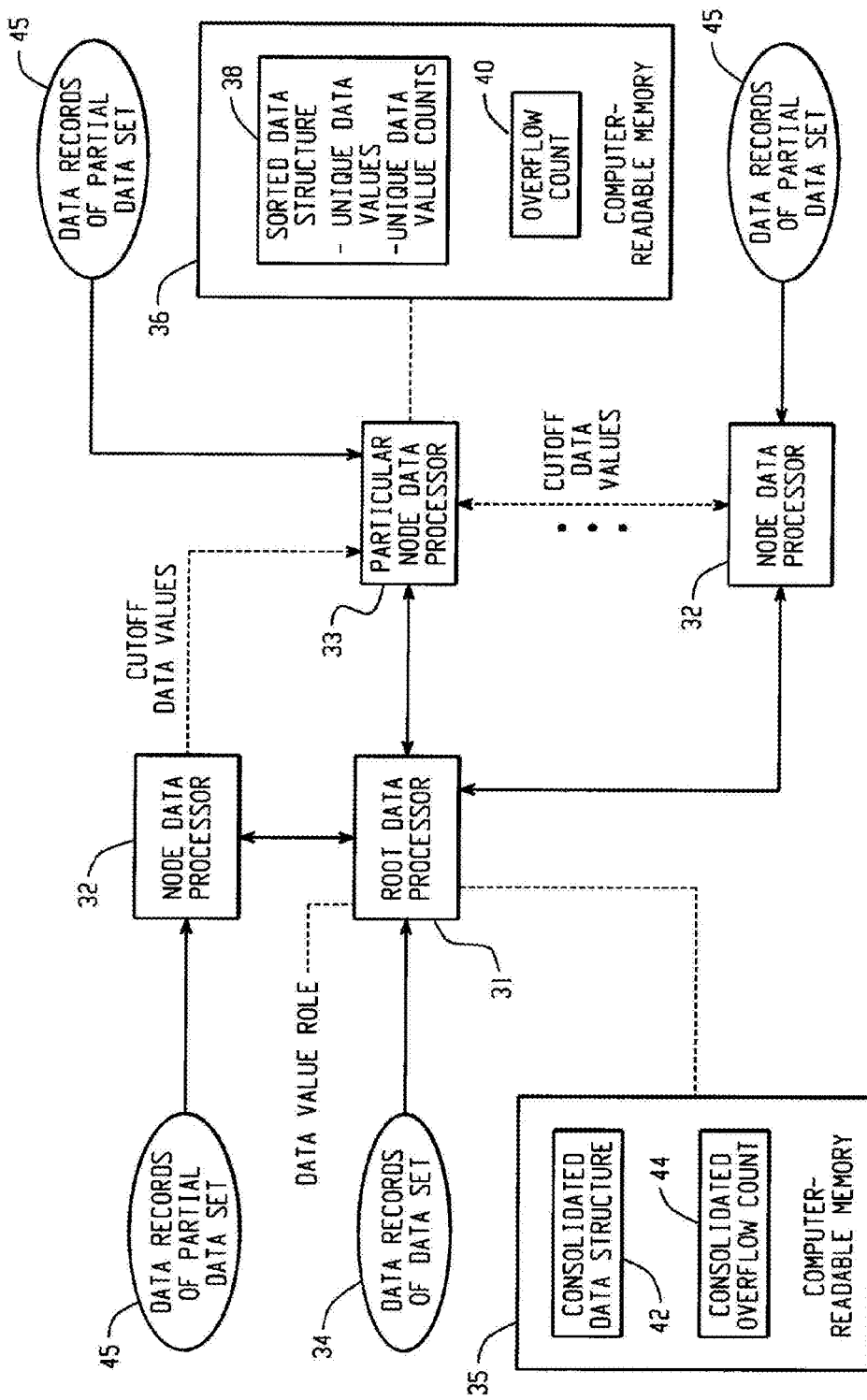
FIG. 3 is a block diagram depicting an example grid-based computing environment that can evaluate data value roles.

FIG. 3 depicts an example grid-based computing system that is configured to execute a method for fast identification of data variable roles during initial data exploration. This example system includes a root data processor 31 and a plurality of worker node data processors 32, 33, wherein one of the worker node data processors is designated as a particular worker node data processor 33 for illustrative purposes. The root data processor 31 is operative to receive data records 34 of a data set on which fast identification of data variable roles will be performed during an initial data exploration operation. The root data processor 31 can communicate bi-directionally with each of the worker node data processors 32, 33, and each of the worker node data processors 32, 33 can communicate bi-directionally with the other worker node data processors 32, 33. Alternatively (or in addition), the worker node data processors 32, 33 may have data records 45 of a portion of the data set pre-distributed to the node instead of all data records 34 of the complete data set being initially stored at the root data processor node.

Also, depicted are computer-readable memory 35 coupled to the root data processor 31 and computer-readable memory 36 coupled to the particular node data processor 33. In some implementations, the computer-readable memory 36 includes a sorted data structure 38 for capturing unique data values and unique data value counts for variables analyzed by the particular node data processor. The computer-readable memory 36 also captures an overflow count 40 for variables analyzed by the particular node data processor. The computer-readable memory 36 and its contents are illustrative of computer-readable memory (not shown) that is coupled to the other node data processors 32.

The computer-readable memory 35 coupled to the root data processor 31 includes a consolidated data structure 42 for combining and recording consolidated data values and counts received from the sorted data structures 38 from the various node data processors 32, 33. The computer-readable memory 35 also captures a consolidated overflow count 44 by combining and consolidating unique overflow counts 40 received from the various node data processors 32, 33.

Figure 4:
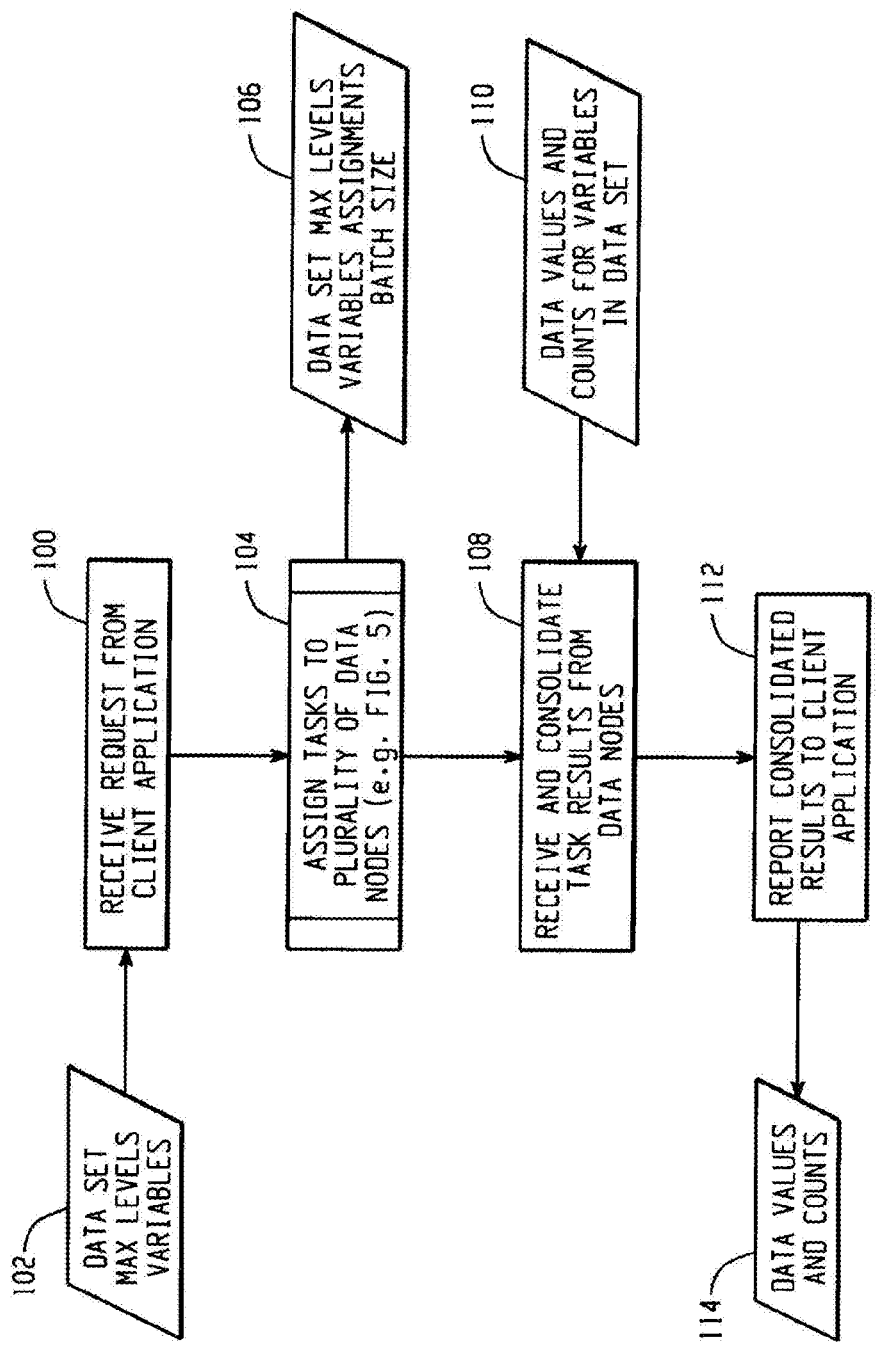
FIG. 4 is a process flow chart that depicts an example process performed by a control node data processor to identify data variable roles.

FIG. 4 depicts an example process performed by a control node data processor of one or more of the systems of FIGS. 1-3 for identifying data variable roles during initial data exploration. At operation 100, a request is received from a client application or user. The request 102 in this example includes the identity of the data set to be explored, the maximum number of levels allowed for each variable explored, and the identity of the variables to be explored.

At operation 104, the control node assigns tasks to one or more worker nodes. The task assignments in this example may be broadcast to all worker nodes. The task assignments include assigning each variable a specific worker node for consolidation of level information. The consolidation information for all variables is eventually sent to the control node. Every worker node is sent the tasking for all worker nodes. The specific assignment 106 for each worker node may include the identity of the data set, the maximum number of levels allowed for each variable explored, the identity of the variables to be explored, a specific variable assigned to a particular worker node, and the portion of the data set assigned to a particular worker node if the data has not been pre-distributed in 45 of FIG. 3.

At operation 108, the control node receives the results of the analysis performed by the worker nodes. The results 110 may include the data values and counts for variables in the data set. In this example, since certain worker nodes are assigned specific variables, the control node may receive from certain worker nodes the values and total counts for their assigned variables. The control node in this case would consolidate all task results from the various reporting worker nodes.

At operation 112, the control node may report the consolidated results to the client application or user. The consolidated results 114 may include the data values and counts for the variables specified by the client application or user in the request 102.

Figure 5:
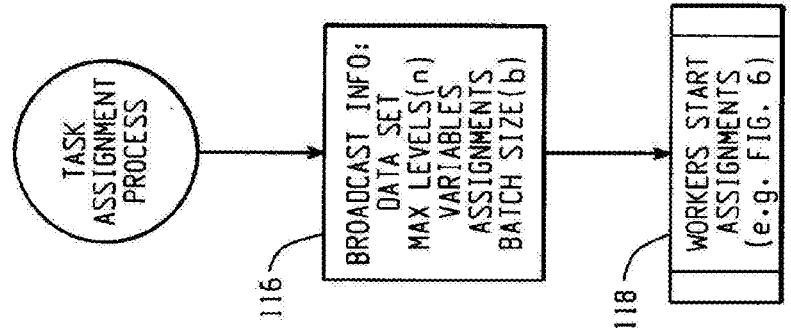
FIG. 5 is a process flow chart that depicts an example process performed by a control node data processor to assign tasks to a plurality of worker node data processors.

FIG. 5 depicts an example process performed by a control node data processor to assign tasks to a plurality of worker node data processors. At operation 116, the control node broadcasts the task assignments to all worker nodes. The assignment for each worker node may include the identity of the data set, the maximum number of levels (n) allowed for each variable explored, the identity of the variables to be explored, a specific variable assigned to a particular worker node, the portion of the data set assigned to a particular worker node, and a batch size (b) identifying the number of observations for a worker node to process before reporting its progress to other worker nodes. After the broadcast, the worker nodes may proceed with processing their portions of the data set (operation 118).

Figure 6:
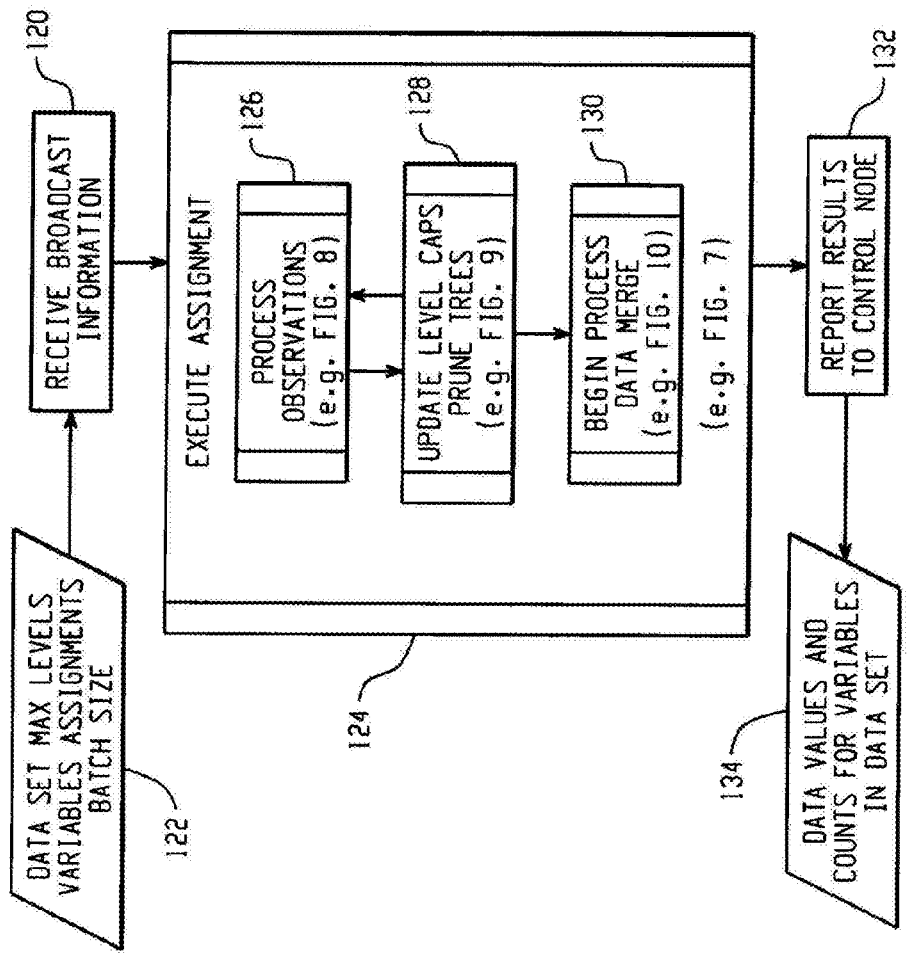
FIG. 6 is a process flow chart that depicts an example process performed by worker node data processors.

FIG. 6 depicts an example process performed by worker node data processors. At operation 120, the worker node processors receive the broadcast information. The broadcast information 122 may include the identity of the data set, the maximum number of levels (n) allowed for each variable explored, the identity of the variables to be explored, a specific variable assigned to a particular worker node, the portion of the data set assigned to a particular worker node, and a batch size (b) identifying the number of observations for a worker node to process before reporting its progress to other worker nodes.

At operation 124, each worker node processor begins executing its assignment. Assignment execution may involve retrieving its assigned portion of the data set, which contains observations to be processed, and processing a first batch of observations (operation 126). Processing observations may involve generating and updating a binary tree for each encountered variable, wherein the binary tree can have no more than the maximum number of levels (n). After a batch size (b) of observations has been processed, each worker node processor broadcasts information regarding its binary trees to allow the collective group of worker node processors to update level caps and prune their binary trees (operation 128). After tree pruning, each worker node processor processes another batch size (b) of observations (operation 126) followed by additional level cap updates and binary tree pruning (operation 128). This cycle repeats until all of the observations are processed. After all of the observations are processed, the worker node processors begin to merge their data (operation 130). After the data merge, the worker node processors report the results relating to their assigned variables to the control node processor (operation 132). The results 134 may include the data values and counts for the variables specified by the client application or user in the request that initiated the analysis.

Figure 7:
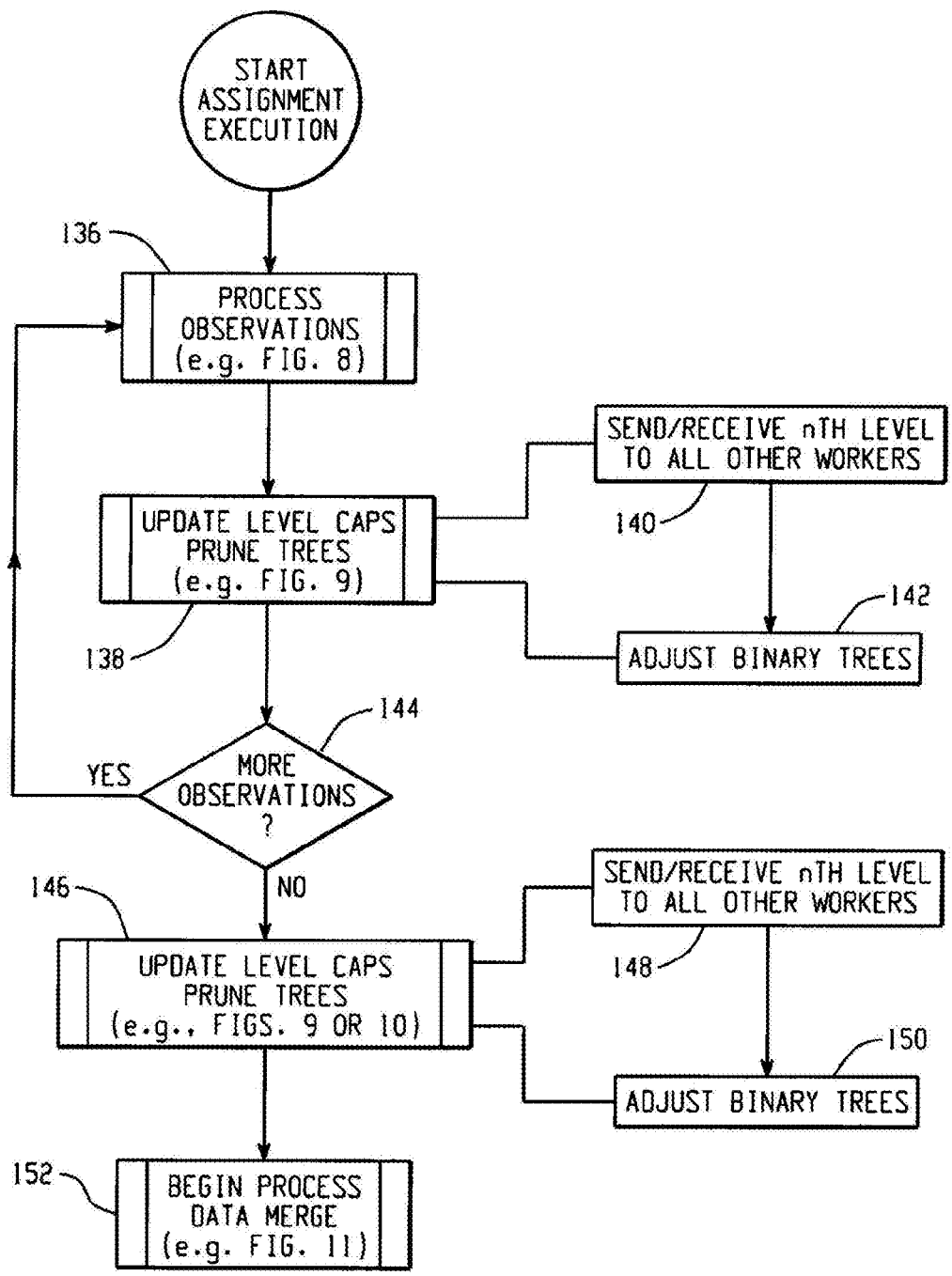
FIG. 7 is a process flow chart that depicts an example process performed by a particular worker node processor when executing its assignment.

FIG. 7 depicts an example process performed by a particular worker node processor when executing its assignment. At operation 136, a particular worker node processor processes a first batch of observations. Processing observations may involve generating and updating a binary tree for each encountered variable, wherein the binary tree can have no more than the maximum number of levels (n). After a batch size (b) of observations has been processed, the worker node processor begins the process of updating the level caps for its binary trees and pruning the binary trees (operation 138). During this operation, the worker node processor broadcasts information regarding its binary trees. In particular, the worker node processor broadcasts for each variable the value of the nth level in the variable's binary tree to the other worker node processors (operation 140). The particular worker node processor at operation 140 also listens for the nth level of corresponding binary trees prepared by the other worker node processors. After receiving the nth level of corresponding binary trees, the particular worker node processor adjusts its binary trees (operation 142) by setting its cap level to the most restrictive of the nth levels received from the other worker node processors and prunes its binary trees.

After tree pruning, the particular worker node processor determines if there are more observations to be processed (operation 144) and processes another batch size (b) of observations (operation 136) if more observations are available for processing. If no more observations are available for processing, the particular worker node processor begins the process of updating the level caps for its binary trees and pruning the binary trees (operation 146) one last time. During this operation, the worker node processor broadcasts for each of its variables the value of the nth level in the variable's binary tree to the other worker node processors (operation 148) and listens for the nth level of corresponding binary trees prepared by the other worker node processors. After receiving the nth level of corresponding binary trees, the particular worker node processor adjusts its binary trees (operation 150) by setting its cap level to the most restrictive of the nth level received from the other worker node processors and prunes its binary trees. After tree pruning, the particular worker node processor begins the data merge process (operation 152).

Figure 8:
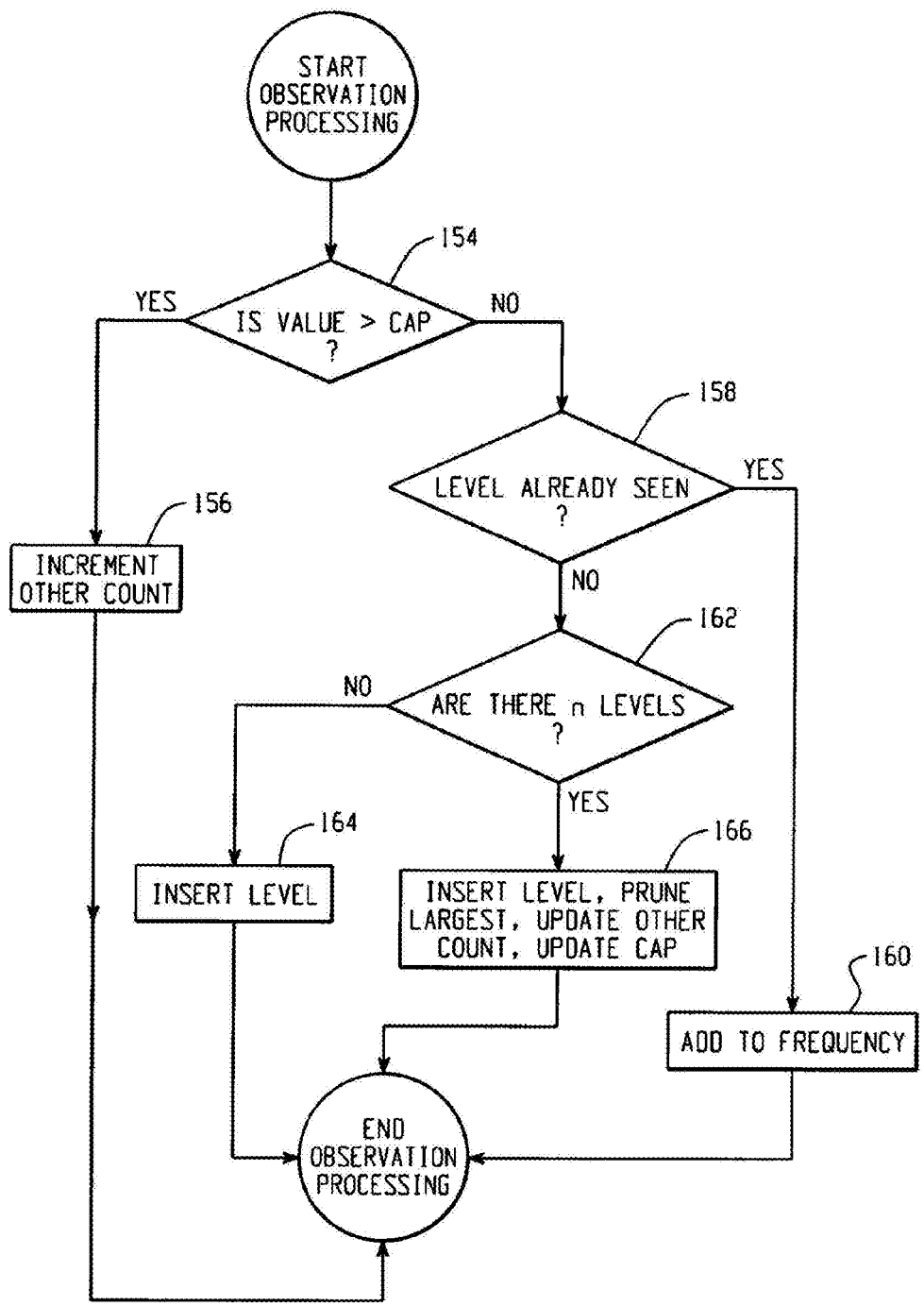
FIG. 8 is a process flow chart that depicts an example process performed by a particular worker node processor to process its assigned observations.

FIG. 8 depicts an example process performed by a particular worker node data processor to process its assigned observations. Each worker node passes through its data creating binary trees of the top n values of each variable. With each new observation, each binary tree is updated. At operation 154, the particular worker node data processor determines if the observation value for a variable is greater than a level cap in the binary tree for that variable. If the value is greater than the cap, then an "other count" counter is incremented (operation 156) and the processing of that observation is completed. If the value is not greater than the cap, then the particular worker node data processor determines if the observation value has already been seen (operation 158). If the level has already been seen, then a frequency counter for that level is incremented (operation 160) and the processing of that observation is completed. If the level has not already been seen, then the particular worker node data processor determines if the binary tree already has n levels (operation 162). If the binary tree does not have n levels, then a level equal to the value of the observation is inserted into the binary tree (operation 164), a frequency count for the level is established, and the processing of that observation is completed. If the binary tree does have n levels, then a level equal to the value of the observation is inserted into the binary tree, the largest level is pruned (or deleted) from the binary tree, the other count counter is incremented by the number in the frequency counter for the pruned level, the level cap is updated to be equal to the value of the largest level (operation 166), and a frequency count for the level is established. The processing of that observation is then completed. After an observation is processed, then the next observation is processed until the batch (b) number of observations has been processed or the last observation has been processed, whichever occurs first.

Figure 9:
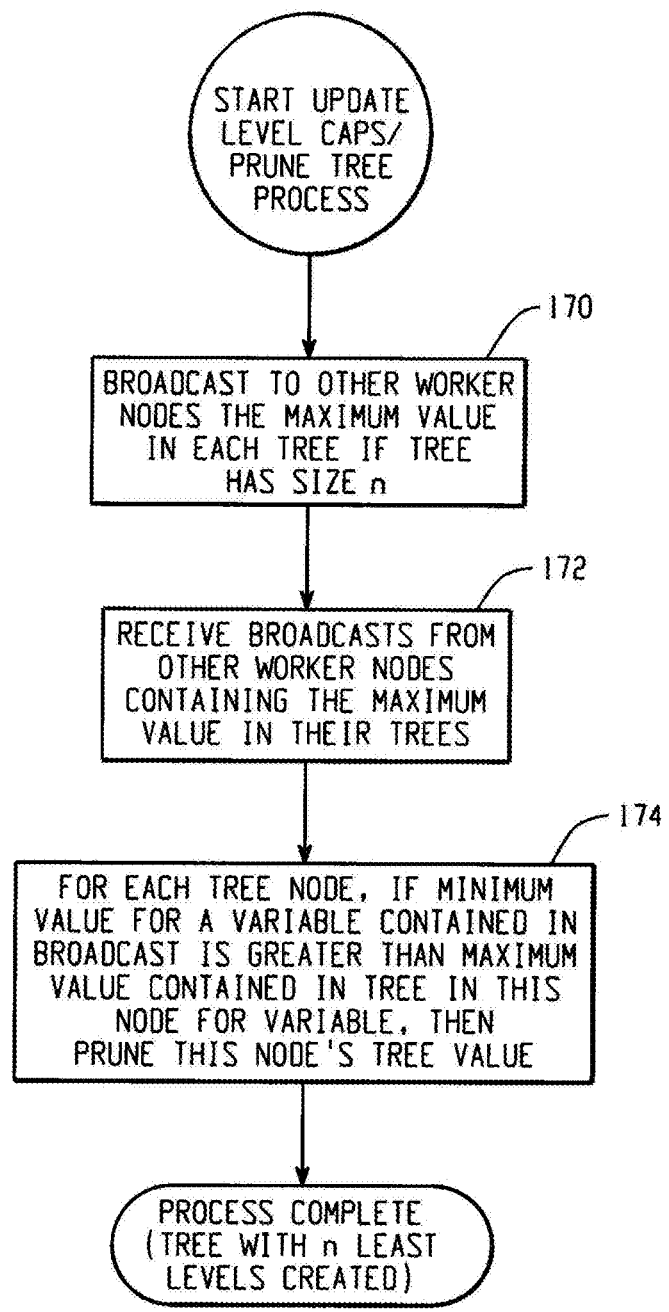
FIG. 9 is a process flow chart that depicts an example process performed by a particular worker node data processor to update level caps and prune trees to create trees with the minimum n levels.

FIG. 9 depicts an example process performed by a particular worker node data processor to update level caps and prune trees after a batch (b) number of observations has been processed or the last observation has been processed. Periodically, every worker node will broadcast to every other worker node the value cap in each of their trees if the trees are of size n. If the trees are of a size strictly less than n, then a special value indicating that no value cap is available for this particular worker node is broadcast. The most restrictive of these value caps is a bound on the value of the nth distinct value. All tree nodes violating this value bound are pruned from every tree. Local memory usage may be reduced as a result of pruning. At operation 170, the particular worker node data processor broadcast to other worker nodes the maximum value in each tree if tree has size n. At operation 172, the particular worker node data processor receives broadcasts from other worker nodes containing the maximum value in their trees. Although this example shows operation 170 occurring before operation 172, this is not required. In appropriate situations, operation 172 may occur at the same time as or prior to operation 170. At operation 174, the particular worker node data processor determines for each tree at the node if the minimum broadcasted value for the tree is less than the level cap for the tree, then prunes the largest value from the tree, inserts the minimum broadcasted value in the tree, and sets the level cap to the minimum broadcasted value.

Figure 10:
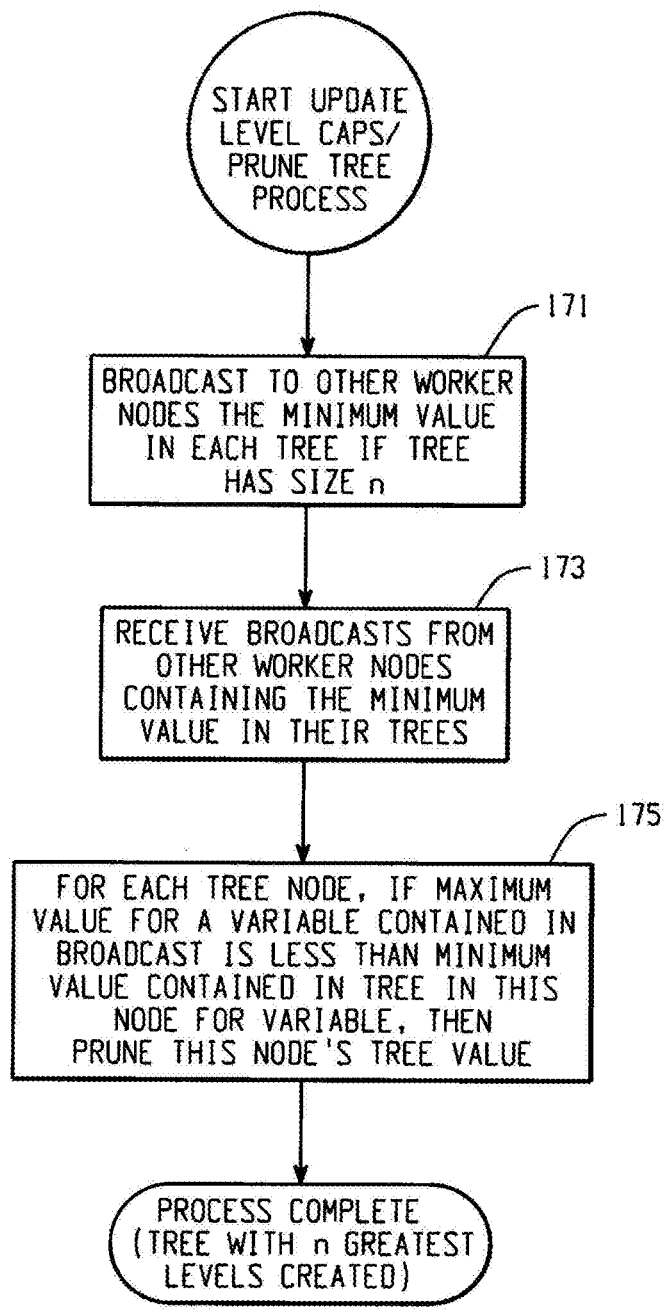
FIG. 10 is a process flow chart that depicts an example process performed by a particular worker node data processor to update level caps and prune trees to create trees with the maximum n levels.

FIG. 10 depicts an example process performed by a particular worker node data processor to update level caps and prune trees after a batch (b) number of observations has been processed or the last observation has been processed. The process depicted in FIG. 10 is similar to that of FIG. 9 except that instead of creating trees with the minimum n levels the process creates trees with the maximum n levels. Periodically, every worker node will broadcast to every other worker node the value cap in each of their trees if the trees are of size n. If the trees are of a size strictly less than n, then a special value indicating that no value cap is available for this particular worker node is broadcast. The most restrictive of these value caps is a bound on the value of the nth distinct value. All tree nodes violating this value bound are pruned from every tree. Local memory usage may be reduced as a result of pruning. At operation 171, the particular worker node data processor broadcast to other worker nodes the minimum value in each tree if tree has size n. At operation 173, the particular worker node data processor receives broadcasts from other worker nodes containing the minimum value in their trees. Although this example shows operation 171 occurring before operation 173, this is not required. In appropriate situations, operation 173 may occur at the same time as or prior to operation 171. At operation 175, the particular worker node data processor determines for each tree at the node if the maximum broadcasted value for the tree is greater than the level cap for the tree, then prunes the smallest value from the tree, inserts the maximum broadcasted value in the tree, and sets the level cap to the maximum broadcasted value.

Figure 11:
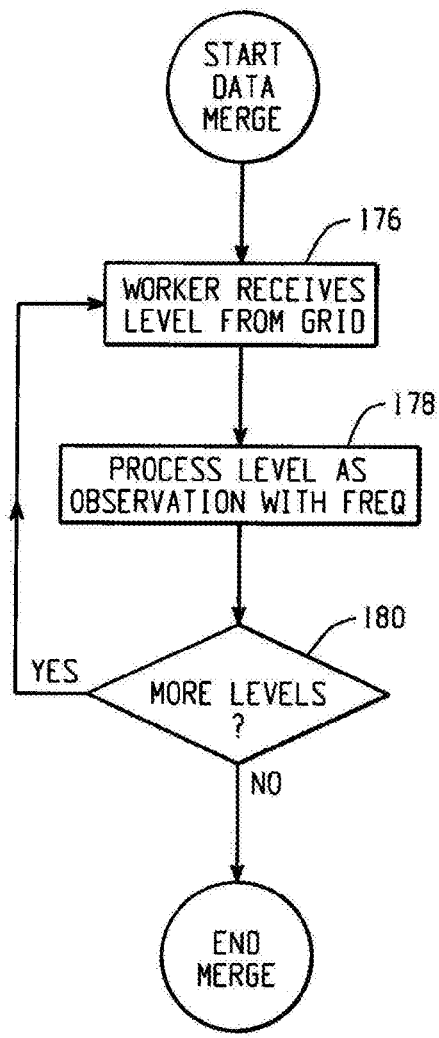
FIG. 11 is a process flow chart that depicts an example process performed by worker node data processors when merging data from other worker node data processors.

Depicted in FIG. 11 is a flow chart illustrating an example process performed by worker node data processors when merging data from other worker node data processors relating to an assigned variable. At operation 176, a particular worker node processor receives for its assigned variable a level value and a frequency count for that level from another worker node processor. At operation 178, the particular worker node processor processes that level as if it was an observation and adds the frequency count to the appropriate counter. After the level is processed, an additional level is processed if it exists (operation 180).

In particular, to process a level a particular worker node processor determines if the observation level has a value that is greater than a level cap in the binary tree for that variable. If the value is greater than the cap, then the "other count" counter is incremented by the amount of the frequency count for the level. If the value is not greater than the cap, then the particular worker node data processor determines if the level value is already in the binary tree. If the level value is already in the binary tree, then the frequency count for that level in the binary tree is incremented by the amount of the frequency count for the received level. If the level value is not already in the binary tree, then the particular worker node data processor determines if the binary tree already has n levels. If the binary tree does not have n levels, then a level equal to the value of the received level is inserted into the binary tree and a frequency count for the level is set to the frequency count for the received level. If the binary tree does have n levels, then a level equal to the value of the received level is inserted into the binary tree, the largest level is pruned (or deleted) from the binary tree, the other count counter is incremented by the number in the frequency counter for the pruned level, frequency count for the new level is set to the frequency count for the received level, and the level cap is updated to be equal to the value of the largest level, a frequency count for the level is established.

Figure 12:
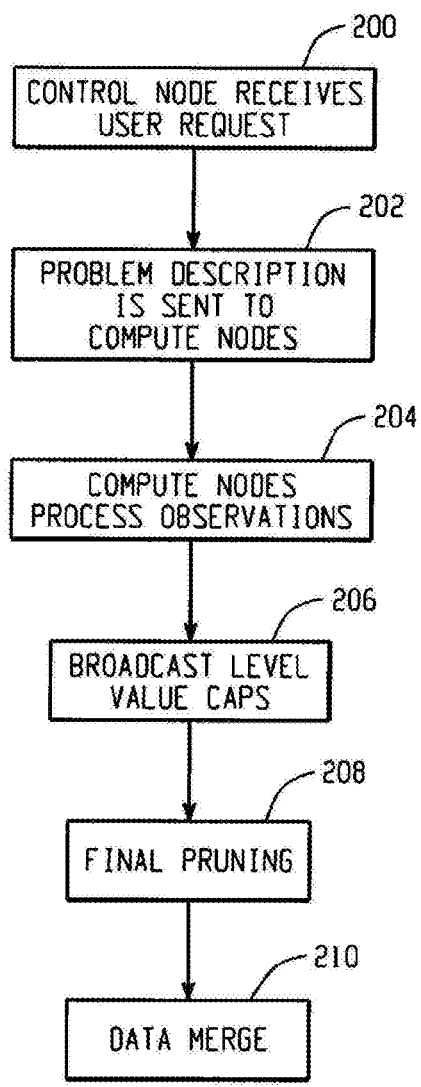
FIG. 12 is a process flow chart that depicts an example process for identifying data variable rules during initial data exploration.

FIG. 12 depicts another example method for identifying data variable roles during initial data exploration. This method is appropriate for either a grid-based computing environment or a standalone computing environment. In this example a computing system having a control node and two compute nodes are used. The control node and compute nodes may be in either a grid-based computing environment or a standalone computing environment. At operation 200 the control node receives a request from a user specifying the data set, the variables (C1 and N1 in the examples in FIGS. 13-17) and a threshold for the number of levels returned (4 in the examples in FIGS. 13-17).

At operation 202, the problem description is sent to the compute nodes. The control node sends the complete problem description to each of the two compute nodes. This includes operational information such as the number of records to process before broadcasting the $4^{th}$ largest observed level and information regarding which compute node is assigned to perform the final aggregation of levels for each variable.

Depicted in FIG. 13 are two tables that, respectively, show the observations that are assigned to compute node 1 and compute node 2. Each table contains observation values for the two variables, C1 and N1.

Referring again to FIG. 12, at operation 204, the compute nodes process observations. Each compute node processes its assigned observations and creates a local tree of the top 4 levels for each variable. Local binary trees are used to keep an ordered copy of the top 4 levels. A description of an example type of binary tree that may be used can be found at Donald Knuth. The Art of Computer Programming, Volume 3, Second Edition. Addison-Wesley, 1998. Pages 426-454, although many other binary tree implementations may be used. The compute nodes process observations in parallel and each variable is processed in a single pass.

The collection of tables at FIGS. 14a and 14b show the state of observed levels recorded in the binary trees after each observation is processed. Changes from the previous state are indicated in bold type. Each of observations 1-4 are recorded in the binary trees and are shown in the tables of FIGS. 14a and 14b. It is not until observation 5 for each compute node is processed that levels are pruned from the binary trees.

The fifth observation is the first instance where there are more than 4 observed levels of Variable N1. At Worker1, the addition of the 29.9 level causes the largest level, 65.3, to be removed from the list and its frequency added to the "Other" level. On Worker2, the 60.5 level causes the 72.1 level to be removed from the list and its frequency added to the "Other" level.

After processing the fifth observation, an intermediate pruning of the variable N1 occurs. Each compute node broadcasts its current $4^{th}$ level (Worker1 sends 51, Worker2 sends 60.5). The value 60.5 is removed from Worker2 (since 60.5>51) and its frequency is added to the "Other" level. The stored levels after this pruning operation are shown in row 5P. Notably, the list for Variable N1 on Worker2 has only 3 levels. When a new level is observed, it will only be added to the list if it is less than or equal to the value used during the last pruning phase, 51. The intermediate pruning done in this operation is optional.

During processing of the sixth observation at Worker1, another pruning of the variable N1 occurs. The value of 51 is removed and its frequency is added to "Other". N1=38.6 is the last value in its tree. During processing of the sixth observation at Worker2, the level 2.1 is added and no pruning is necessary. Shown in the final two tables of FIG. 14b, are the states of the binary trees after all six observations have been processed at both compute nodes.

No pruning was needed for the variable C1 on either compute node since the cardinality of C1 was not greater than 4. Also, during the processing of the observations, pruning of any variable can take place as soon as the cardinality of the variable processed at any node reaches the maximum level set by the user.

Referring again to FIG. 12, at operation 206, the compute nodes broadcast maximum level values. After all observations are processed, each compute node broadcasts its 4th level of each variable one last time (or a special value indicating there is no 4th level).

At operation 208, final pruning is done. Once the broadcast of largest level values occurs final pruning can begin. For Variable C1, none of the worker node has attained the preset maximum number of level so no pruning occurs for Variable C1 levels. For Variable N1, Worker1 broadcasts 38.6 and Worker2 broadcasts 35.2. Since the Worker2 maximum level is lower, the Worker 1 level list is pruned. The final level lists for both worker nodes are shown in FIG. 15.

At operation 210, data merge takes place. The values for Variable C1 are merged on Worker1. In this case C1 has the same levels on both nodes. An upper bound of 6 on the cardinality after the merge of C1 is possible depending on the levels on each node. Since the two worker nodes contain the same levels, the cardinality of C1 (3) after the 3 merges will remain the same. Only the frequency values will be updated. Arrows in FIG. 16 indicate how levels on one compute node are merged with the other compute node.

Merging of the values for N1 is illustrated in FIGS. 17A-17E. In this example, merging involves adding the nodes from the tree on Worker 1 to the nodes of the tree that exists on Worker2. In particular, FIG. 17A illustrates the merger of level 17.3 from Worker 1 with the Worker 2 table. FIG. 17B illustrates the merger of level 21.2 from Worker 1 with the Worker 2 table. FIG. 17C illustrates the merger of level 29.2 from Worker 1 with the Worker 2 table. FIG. 17D illustrates the merger of the Other data from Worker 1 with the Other data in the Worker 2 table. And, the final tables in FIG. 17E illustrate the final result after the data merge is complete. The final tables resulting from the data merge can either be written to a distributed data set or sent to the control node and then output to a client.

In the examples of FIGS. 8-9 and 13-17, the level having the largest value is pruned when tree pruning is performed. Any of these examples, however, could alternatively be modified so that the level having the smallest value is pruned instead as illustrated in FIG. 10.

The operations depicted in FIGS. 4-17 may be implemented by one or more processors executing programming instructions. The programming instructions may be stored in data stores and/or computer-readable memory.

The foregoing examples illustrate systems having separate control and worker nodes. Separate control and worker nodes, however, are not required. A control node may also function as a worker node.

Referring back to FIGS. 1 and 2, depicted are examples of systems that may be used to identify data variable roles during initial data exploration. FIG. 1, in particular, depicts an example client/server environment, and FIG. 2 depicts a system that can be used in either a standalone environment or a client/server environment.

FIGS. 1 and 2 also depict example grid-based computing systems that may be used to identify data variable roles during initial data exploration, but a grid-based computing system is not required. The control node could also function as a worker node in a system containing only a single worker node. In that case, the system may comprise a single computer.

Figure 18:
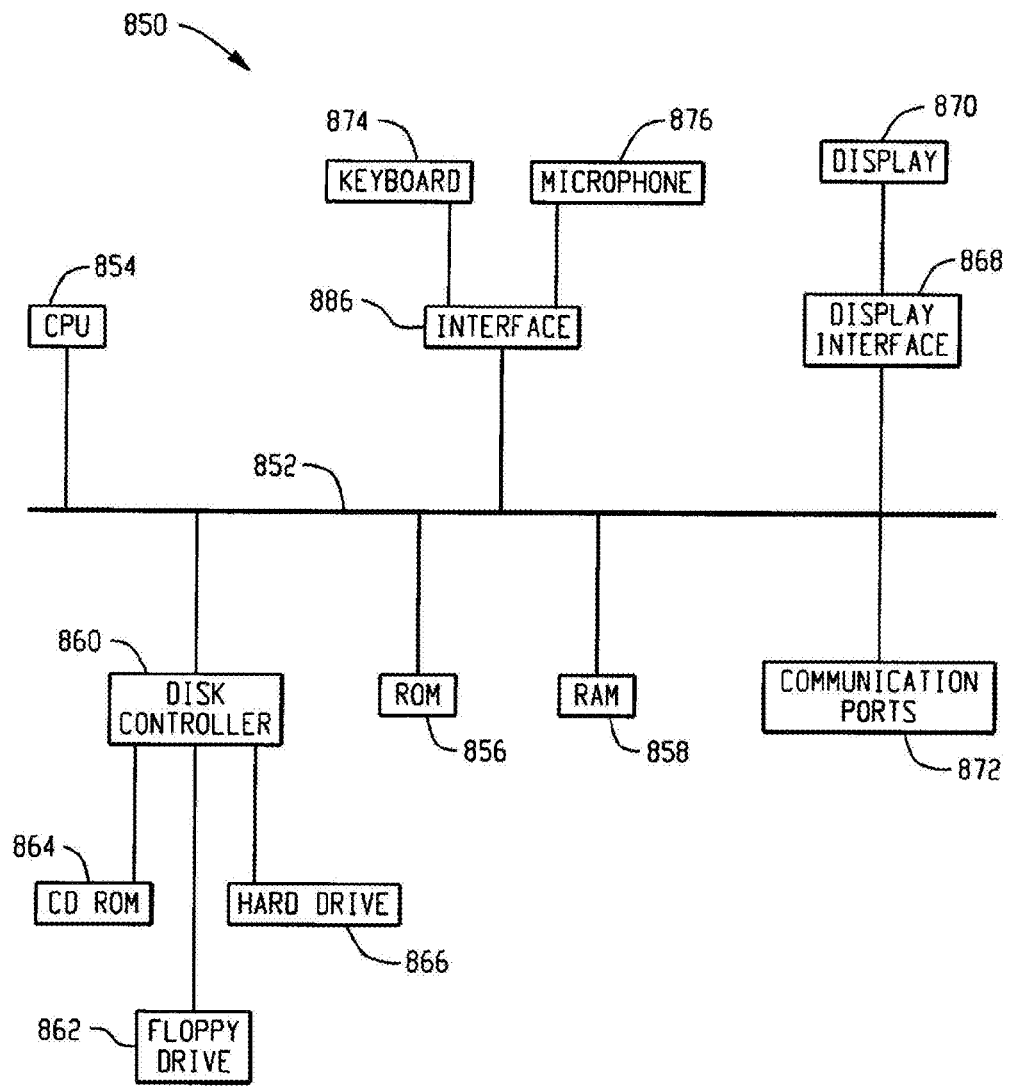
FIG. 18 is a block diagram of example hardware for either standalone or client/server computer architecture.

FIG. 18 shows a block diagram of example hardware for either standalone or client/server computer architecture 850, such as the architecture depicted in FIGS. 1 and 2 that may be used to contain and/or implement the program instructions of system embodiments of the present disclosure. A bus 852 may connect the other illustrated components of the hardware. A processing system 854 labeled CPU (central processing unit) (e.g., one or more computer processors), may perform calculations and logic operations required to execute a program. A processor-readable storage medium, such as read only memory (ROM) 856 and random access memory (RAM) 858, may be in communication with the processing system 854 and may contain one or more programming instructions for performing an index join operation. Optionally, program instructions may be stored on a computer readable storage medium such as a magnetic disk, optical disk, recordable memory device, flash memory, or other physical storage medium. Computer instructions may also be communicated to other systems, components or devices.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processing system 854 may access each component as required.

A display interface 868 may permit information from the bus 852 to be displayed on a display 870 in audio, graphic, or alphanumeric format. Communication with external devices may optionally occur using various communication ports 872.

In addition to the standard computer-type components, the hardware may also include data input devices, such as a keyboard 874, or other input device 876, such as a microphone, remote control, pointer, mouse and/or joystick.

In some implementations, before performing analytics on a possibly large and distributed data set a determination can be made regarding the variables that can potentially be used as class variables or as numeric (interval) variables. Some variables may be suitable for inclusion in the analysis even if may they contain many distinct levels. In addition, getting accurate frequency counts for a subset of levels can provide additional insight into the data set.

Figure 19:
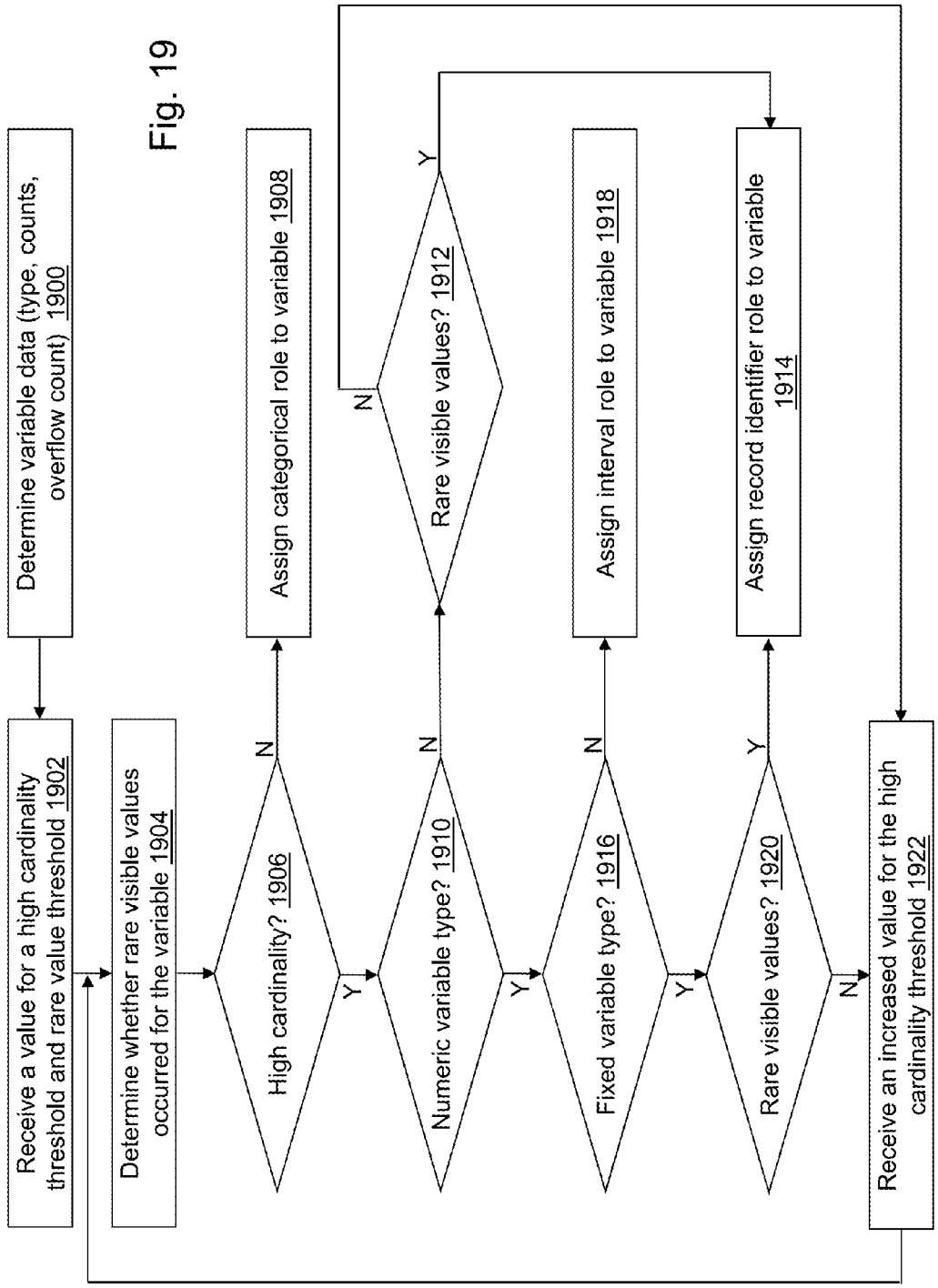
FIG. 19 is another process flow chart that depicts an example process for identifying data variable rules during initial data exploration.

FIG. 19 depicts an example method for identifying data variable roles during initial data exploration. This method is appropriate for either a grid-based computing environment or a standalone computing environment. The operations depicted in FIG. 19 may be implemented by one or more processors executing programming instructions. Additional, fewer, or different operations may be performed depending on the embodiment. The order of presentation of the operations of FIGS. 4-12 and 19 are not intended to be limiting. Although some of the operational flows are presented in sequence, the various operations may be performed in various repetitions, concurrently (in parallel, for example, using threads), and/or in other orders than those that are illustrated.

At operation 1900, variable data is determined. For example, a variable type, the unique data values and associated unique data value counts, and the overflow count are read from a processor-readable storage medium for a variable such as variable C1 or variable N1 in the examples in FIGS. 13-17. A variable type may include numeric or character. A numeric variable type may be further divisible between a fixed variable type and a non-fixed variable type. For example, a fixed variable type may be any integer type or any floating point number type for which each value is a floor or a ceiling value.

For example, Table I below shows a variable "Job" with a threshold for the number of levels returned of five:

TABLE I

| Counter | Unique data value count | Summed value count | Rarity value | Unique data value |
|---|---|---|---|---|
| 1 | 439 | 439 | 0.223296 | Retail Sales |
| 2 | 46 | 485 | 0.246694 | Sales |
| 3 | 114 | 599 | 0.30468 | Mechanic |

TABLE I-continued

| Counter | Unique data value count | Summed value count | Rarity value | Unique data value |
|---|---|---|---|---|
| 4 | 42 | 641 | 0.326043 | Agri-business |
| 5 | 11 | 652 | 0.331638 | Other |
| Overflow | 1314 | 1966 | 1 | |

As another example, Table II below shows a variable "Job" with a threshold for the number of levels returned of ten:

TABLE II

| Counter | Unique data value count | Summed value count | Rarity value | Unique data value |
|---|---|---|---|---|
| 1 | 439 | 439 | 0.223296 | Retail Sales |
| 2 | 46 | 485 | 0.246694 | Sales |
| 3 | 114 | 599 | 0.30468 | Mechanic |
| 4 | 42 | 641 | 0.326043 | Agri-business |
| 5 | 11 | 652 | 0.331638 | Other |
| 6 | 766 | 1418 | 0.721261 | Manufacturing |
| 7 | 25 | 1443 | 0.733978 | Local Government |
| 8 | 29 | 1472 | 0.748728 | Health Care |
| 9 | 1 | 1473 | 0.749237 | Wholesale Marketing |
| 10 | 7 | 1480 | 0.752798 | Finance |
| Overflow | 486 | 1966 | 1 | |

At operation 1902, a value for a high cardinality threshold and a value for a rare value threshold are received, for example, from a user or from a processor-readable storage medium. The value for the high cardinality threshold may be less than or equal to the maximum number of levels (n) allowed for each variable explored. The value for the rare value threshold may be a small number that may be defined as a percentage. For example, the value for the rare value threshold may be 0.01%, 0.05%, 0.1%, 1%, etc.

When the value for the high cardinality threshold is less than the threshold for the number of levels returned, the levels greater than the high cardinality threshold can be collapsed into the overflow count.

At operation 1904, whether or not the unique data values and associated unique data value counts and the overflow count indicate rare visible values for the variable is determined. A rarity value is computed as a sum of the unique data value counts divided by the overflow count. The rarity value is compared to the value for the rare value threshold. If the rarity value is less than the value for the rarity value threshold, rare visible values occurred for the variable.

Figure 20:
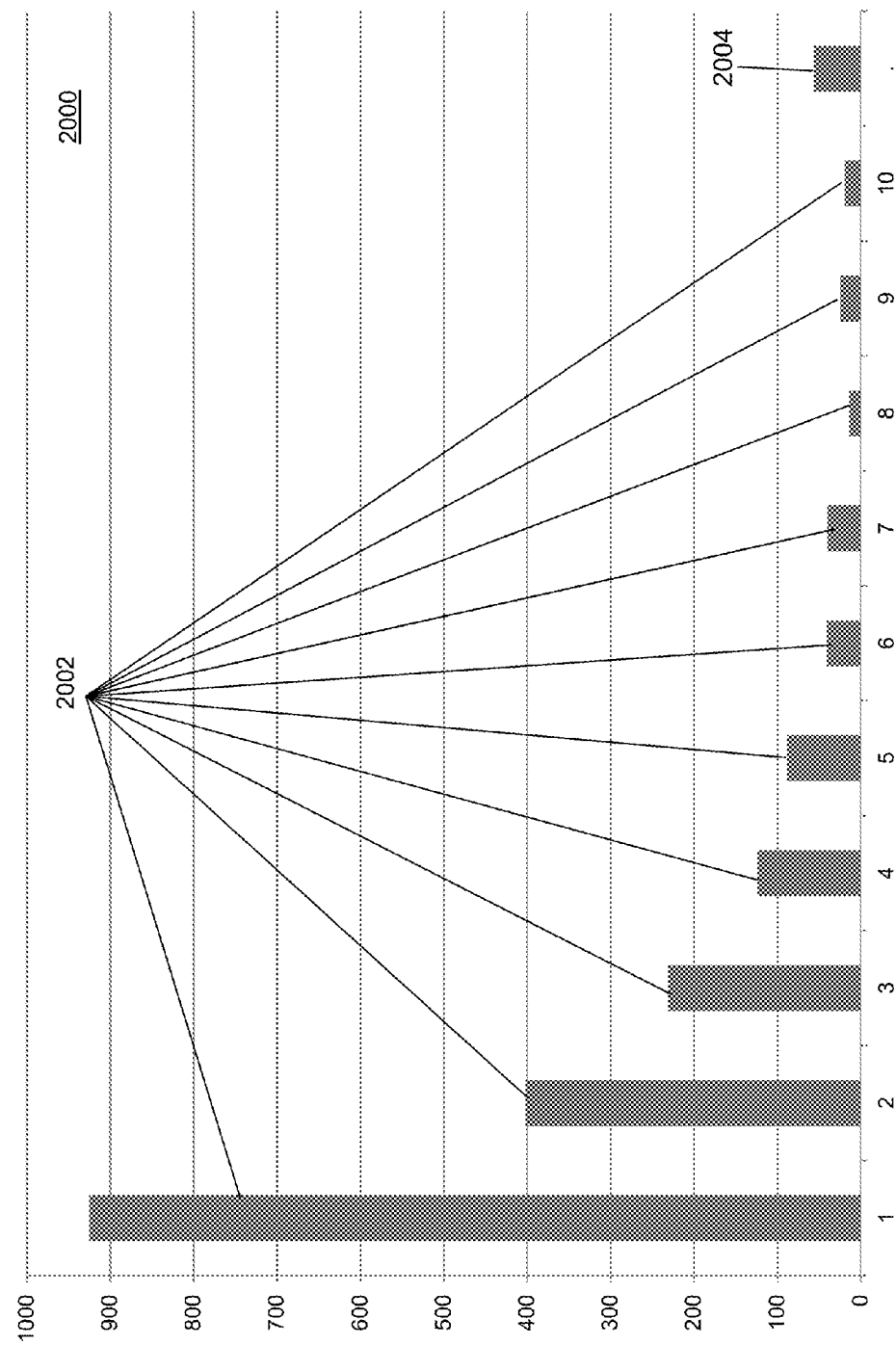
FIG. 20 is a histogram illustrating a variable for which rare visible values did not occur.

For example, FIG. 20 depicts a first histogram 2000 for which the threshold for the number of levels returned was 10. Unique data value count values 2002 are shown for each respective level. A first overflow count value 2004 shows the overflow count. First histogram 2000 illustrates a variable for which rare visible values did not occur for the variable. First overflow count value 2004 is smaller than half of the unique data value count values 2002.

Figure 21:
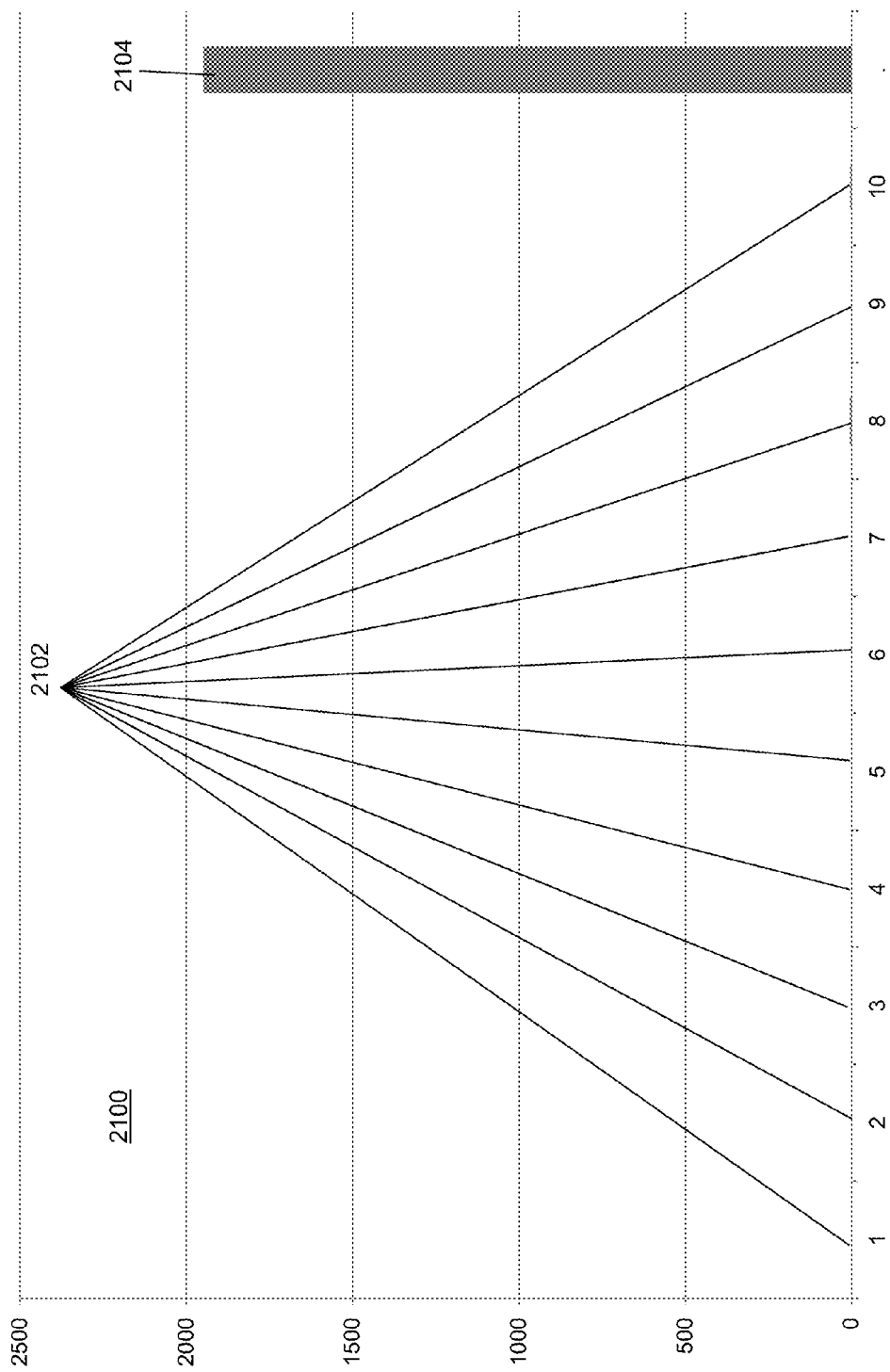
FIG. 21 is a histogram illustrating a variable for which rare visible values did occur.

As another example, FIG. 21 depicts a second histogram 2100 for which the threshold for the number of levels returned was 10. Unique data value count values 2102 are shown for each respective level though the values are not readily visible with the y-scale used to present second histogram 2100. The y-scale is selected to show a second overflow count value 2104, which shows the overflow count. Second histogram 2100 illustrates a variable for which rare visible values did occur for the variable. Second overflow count value 2104 is much larger than all of the unique data value count values 2102.

Figure 22:
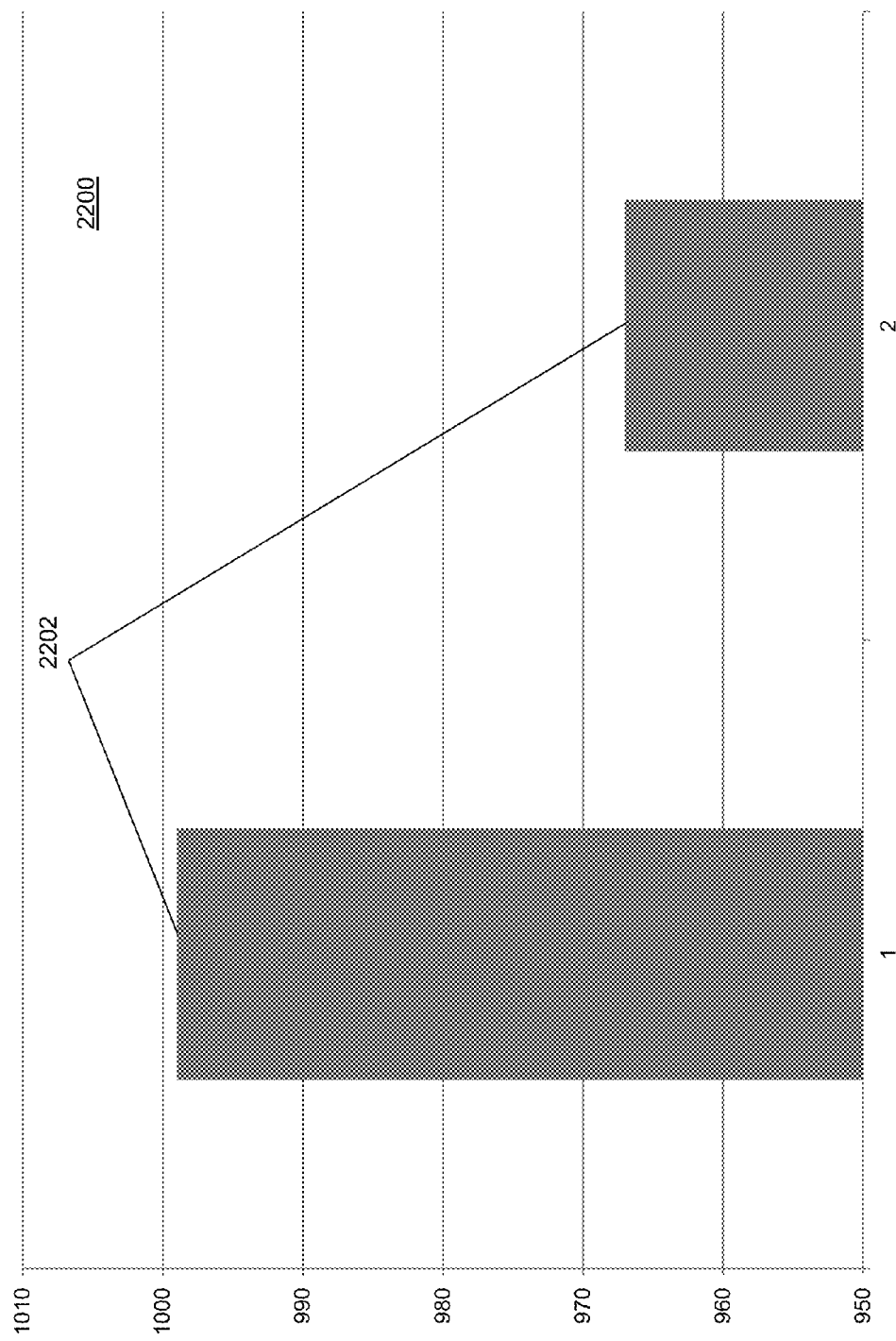
FIG. 22 is a second histogram illustrating a variable for which rare visible values did not occur.

As yet another example, FIG. 22 depicts a third histogram 2200 for which the threshold for the number of levels returned was 10. Unique data value count values 2202 are shown for each respective level though third histogram 2200 only includes two bars because only two values of the variable were identified in the data exploration. Third histogram 2200 illustrates a variable for which rare visible values did not occur for the variable. The overflow count is zero indicating that all of the values of the variable are captured in third histogram 2200.

At operation 1906, a determination is made concerning whether or not the variable has a high cardinality. When the variable has a high cardinality, processing continues at operation 1910. When the variable does not have a high cardinality, processing continues at operation 1908. For example, low cardinality may be determined when a number of the unique data values is less than or equal to the value for the high cardinality threshold. Low cardinality also may be determined when a value of the overflow count is zero.

At operation 1908, a class or categorical role is assigned to the variable.

At operation 1910, a determination is made concerning whether or not the variable has a numeric variable type. When the variable has a numeric variable type, processing continues at operation 1916. When the variable does not have a numeric variable type, processing continues at operation 1912. For example, a non-numeric variable type may be determined when the variable is a character variable.

At operation 1912, a determination is made concerning whether or not rare visible values occurred for the variable as determined in operation 1904. When rare visible values occurred for the variable, processing continues at operation 1914. When rare visible values did not occur for the variable, processing continues at operation 1922.

At operation 1914, an index or a record identifier role is assigned to the variable.

At operation 1916, a determination is made concerning whether or not the variable has a fixed variable type. When the variable has a fixed variable type, processing continues at operation 1918. When the variable does not have a fixed variable type, processing continues at operation 1920.

At operation 1918, an interval role is assigned to the variable.

At operation 1920, a determination is made concerning whether or not rare visible values occurred for the variable as determined in operation 1904. When rare visible values occurred for the variable, processing continues at operation 1914. When rare visible values did not occur for the variable, processing continues at operation 1922.

At operation 1922, an increased value for the high cardinality threshold is received, for example, from a user. Processing continues in operation 1904 to repeat the processing of the variable with the increased value when the increased value is less than or equal to the threshold for the number of levels returned. For example, if the number of levels returned was ten and the increased value for the high cardinality threshold is less than or equal to ten, processing of the data is repeated with the increased value by revaluating the distribution of the unique data value counts and the overflow count. When the increased value is greater than the threshold for the number of levels returned, processing of the data set is repeated to break down the overflow count into new levels before processing continues in operation 1904. For example, if the number of levels returned was five and the increased value for the high cardinality threshold is greater than five, processing of the data as described above to generate new consolidated results 114 that split out the overflow count into the additional levels is performed. For example, Table II is created. The user may choose not to increase the value for the high cardinality threshold in which case the variable is assigned an "unknown" role.

An example categorical/class variable is an occupation, a car model, a political affiliation, a religious affiliation, a patient group identified, etc. Interval variables are typically numerical measures of various quantities such as a weight, a temperature, a net worth, etc. An example record identifier variable is a social security number, or a full name of an entity, an employee number, a customer identifier, etc.

A variable role determination affects many applications that can use knowledge of a variable role prior to running the application to improve the application performance in terms of accuracy and/or in terms of speed of execution and/or amount of memory used. For example, the following types of applications treat variables having different determined variable roles differently:

Regression, classification trees, and many other analytical methods process categorical role variables differently from interval role variables.

In statistical graphing of data, the many types of graphs available for presenting data are sometimes not informative for specific types of variables. For example, pie charts and histograms are informative only for variables with low cardinality such as categorical role variables while line graphs are more convenient for high cardinality numeric variables such as interval role variables. High cardinality character variables such as those assigned a record identifier role may be most informative when using a heat map type graph.

In statistical surveys, stratified sampling is a common technique where the cardinality of the variable affects the sampling algorithm and, of course, the results. Variables with role categorical are essential to extracting stratified samples. Stratified sampling cannot be applied to a data set when all variables have roles of an interval or a record identifier.

Reconstruction of primary keys or creating secondary keys in databases. Variables with a role of record identifier are the prime candidates for keys.

The patentable scope of the described subject matter may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A method for determining a variable role, the method comprising:

determining, by a processor, a variable type, unique data value count values, and an overflow count value for a variable, wherein the unique data value count values include a number of occurrences of each of a plurality of unique data values for the variable in a data set, wherein the overflow count value is a number of occurrences of data values other than the plurality of unique data values for the variable in the data set;

determining, by the processor, that the variable is a high cardinality variable when a number of the plurality of unique data values is greater than a value for a high cardinality threshold, or determining, by the processor, that the variable is not a high cardinality variable when a number of the plurality of unique data values is less than a value for a high cardinality threshold;

when the variable is determined to not be the high cardinality variable, assigning, by the processor, a class variable role to the variable, or, when the variable is determined to be the high cardinality variable, determining, by the processor, whether or not the variable is a numeric variable type based on the determined variable type;

when the variable is determined to not be the numeric variable type, comparing, by the processor, the overflow count value to the unique data value count values to determine whether or not rare visible values occurred for the variable; and when the determination is that rare visible values occurred for the variable, assigning, by the processor, a record identifier variable role to the variable.

2. The method of claim 1, wherein comparing the overflow count value to the unique data value count values comprises:

computing a rarity value as a sum of the unique data value count values divided by the overflow count value; and comparing the computed rarity value to a value of a rare value threshold, wherein the computed rarity value less than the rare value threshold results in a determination that rare visible values occurred for the variable.

3. The method of claim 1, wherein, when the variable type is a character variable type, the variable is determined to not be the numeric variable type.

4. The method of claim 1, further comprising, when the variable is determined to not be the numeric variable type and the determination is that rare visible values did not occur for the variable:

receiving, by the processor, a new value for the high cardinality threshold;

determining, by the processor, that the variable is the high cardinality variable when the number of the plurality of unique data values is greater than the new value for the high cardinality threshold; and when the variable is not determined to be the high cardinality variable, assigning, by the processor, the class variable role to the variable.

5. The method of claim 1, further comprising, when the variable is determined to be the high cardinality variable and to be the numeric variable type:

determining, by the processor, whether or not the variable is a fixed variable type based on the variable type; and when the variable is determined to not be the fixed variable type, assigning, by the processor, an interval variable role to the variable.

6. The method of claim 5, wherein determining whether or not the variable is the fixed variable type is further based on data values of the variable relative to a floor value or a ceiling value of the variable type.

7. The method of claim 5, wherein the variable is determined to be the fixed variable type when the variable type is an integer.

8. The method of claim 5, further comprising, when the variable is determined to be the high cardinality variable and the fixed variable type and when the determination is that rare visible values occurred for the variable, assigning, by the processor, a record identifier variable role to the variable.

9. The method of claim 5, wherein comparing the overflow count value to the unique data value count values comprises:

computing a rarity value as a sum of the unique data value count values divided by the overflow count value; and comparing the computed rarity value to a value of a rare value threshold, wherein the computed rarity value less than the rare value threshold results in a determination that rare visible values occurred for the variable.

10. The method of claim 5, further comprising, when the variable is determined to be the high cardinality variable and the fixed variable type and when the determination is that rare visible values did not occur for the variable:

receiving, by the processor, a new value for the high cardinality threshold;

determining, by the processor, that the variable is the high cardinality variable when the number of the plurality of unique data values is greater than the new value for the high cardinality threshold; and when the variable is not determined to be the high cardinality variable, assigning, by the processor, the class variable role to the variable.

11. The method of claim 10, wherein comparing the overflow count value to the unique data value count values comprises:

computing a rarity value as a sum of the unique data value count values divided by the overflow count value; and comparing the computed rarity value to a value of a rare value threshold, wherein the computed rarity value less than the rare value threshold results in a determination that rare visible values occurred for the variable.

12. A computer system comprising:

a processor; and a non-transitory computer-readable medium encoded with data processing instructions comprising instructions for configuring the processor to determine a variable type, unique data value count values, and an overflow count value for a variable, wherein the unique data value count values include a number of occurrences of each of a plurality of unique data values for the variable in a data set, wherein the overflow count value is a number of occurrences of data values other than the plurality of unique data values for the variable in the data set;

determine that the variable is a high cardinality variable when a number of the plurality of unique data values is greater than a value for a high cardinality threshold;

when the variable is not determined to be the high cardinality variable, assign a class variable role to the variable;

when the variable is determined to be the high cardinality variable, determine whether or not the variable is a numeric variable type based on the determined variable type;

when the variable is determined to not be the numeric variable type, compare the overflow count value to the unique data value count values to determine whether or not rare visible values occurred for the variable; and when the determination is that rare visible values occurred for the variable, assign a record identifier variable role to the variable.

13. The computer system of claim 12, wherein comparing the overflow count value to the unique data value count values comprises:

computing a rarity value as a sum of the unique data value count values divided by the overflow count value; and comparing the computed rarity value to a value of a rare value threshold, wherein the computed rarity value less than the rare value threshold results in a determination that rare visible values occurred for the variable.

14. The computer system of claim 12, wherein, when the variable type is a character variable type, the variable is determined to not be the numeric variable type.

15. The computer system of claim 12, further comprising, when the variable is determined to not be the numeric variable type and the determination is that rare visible values did not occur for the variable:

receiving, by the processor, a new value for the high cardinality threshold;

determining, by the processor, that the variable is the high cardinality variable when the number of the plurality of unique data values is greater than the new value for the high cardinality threshold; and when the variable is not determined to be the high cardinality variable, assigning, by the processor, the class variable role to the variable.

16. The computer system of claim 12, further comprising, when the variable is determined to be the high cardinality variable and to be the numeric variable type:

determining, by the processor, whether or not the variable is a fixed variable type based on the variable type; and when the variable is determined to not be the fixed variable type, assigning, by the processor, an interval variable role to the variable.

17. The computer system of claim 16, wherein determining whether or not the variable is the fixed variable type is further based on data values of the variable relative to a floor value or a ceiling value of the variable type.

18. The computer system of claim 16, wherein the variable is determined to be the fixed variable type when the variable type is an integer.

19. The computer system of claim 16, further comprising, when the variable is determined to be the high cardinality variable and the fixed variable type and when the determination is that rare visible values occurred for the variable, assigning, by the processor, a record identifier variable role to the variable.

20. The computer system of claim 16, wherein comparing the overflow count value to the unique data value count values comprises:
   computing a rarity value as a sum of the unique data value count values divided by the overflow count value; and
   comparing the computed rarity value to a value of a rare value threshold,
   wherein the computed rarity value less than the rare value threshold results in a determination that rare visible values occurred for the variable.

21. The computer system of claim 16, further comprising, when the variable is determined to be the high cardinality variable and the fixed variable type and when the determination is that rare visible values did not occur for the variable:
   receiving, by the processor, a new value for the high cardinality threshold;
   determining, by the processor, that the variable is the high cardinality variable when the number of the plurality of unique data values is greater than the new value for the high cardinality threshold; and
   when the variable is not determined to be the high cardinality variable, assigning, by the processor, the class variable role to the variable.

22. The computer system of claim 21, wherein comparing the overflow count value to the unique data value count values comprises:
   computing a rarity value as a sum of the unique data value count values divided by the overflow count value; and
   comparing the computed rarity value to a value of a rare value threshold,
   wherein the computed rarity value less than the rare value threshold results in a determination that rare visible values occurred for the variable.

23. A computer-program product tangibly embodied in a machine-readable non-transitory storage medium and including instructions configured to cause a data processing apparatus to:
   determine a variable type, unique data value count values, and an overflow count value for a variable, wherein the unique data value count values include a number of occurrences of each of a plurality of unique data values for the variable in a data set, wherein the overflow count value is a number of occurrences of data values other than the plurality of unique data values for the variable in the data set;
   determine that the variable is a high cardinality variable when a number of the plurality of unique data values is greater than a value for a high cardinality threshold;
   when the variable is not determined to be the high cardinality variable, assign a class variable role to the variable;
   when the variable is determined to be the high cardinality variable, determine whether or not the variable is a numeric variable type based on the determined variable type;
   when the variable is determined to not be the numeric variable type, compare the overflow count value to the unique data value count values to determine whether or not rare visible values occurred for the variable; and
   when the determination is that rare visible values occurred for the variable, assign a record identifier variable role to the variable.

24. The computer-program product of claim 23, wherein comparing the overflow count value to the unique data value count values comprises:
   computing a rarity value as a sum of the unique data value count values divided by the overflow count value; and
   comparing the computed rarity value to a value of a rare value threshold,
   wherein the computed rarity value less than the rare value threshold results in a determination that rare visible values occurred for the variable.

25. The computer-program product of claim 23, wherein, when the variable type is a character variable type, the variable is determined to not be the numeric variable type.

26. The computer-program product of claim 23, further comprising, when the variable is determined to not be the numeric variable type and the determination is that rare visible values did not occur for the variable, instructions configured to cause the data processing apparatus to:
   receive a new value for the high cardinality threshold;
   determine that the variable is the high cardinality variable when the number of the plurality of unique data values is greater than the new value for the high cardinality threshold; and
   when the variable is not determined to be the high cardinality variable, assign the class variable role to the variable.

27. The computer-program product of claim 23, further comprising, when the variable is determined to be the high cardinality variable and to be the numeric variable type, instructions configured to cause the data processing apparatus to:
   determine whether or not the variable is a fixed variable type based on the variable type; and
   when the variable is determined to not be the fixed variable type, assign an interval variable role to the variable.

28. The computer-program product of claim 27, wherein determining whether or not the variable is the fixed variable type is further based on data values of the variable relative to a floor value or a ceiling value of the variable type.

29. The computer-program product of claim 27, wherein the variable is determined to be the fixed variable type when the variable type is an integer.

30. The computer-program product of claim 27, further comprising, when the variable is determined to be the high cardinality variable and the fixed variable type and when the determination is that rare visible values occurred for the variable, instructions configured to cause the data processing apparatus to assign a record identifier variable role to the variable.

31. The computer-program product of claim 27, wherein comparing the overflow count value to the unique data value count values comprises:
   computing a rarity value as a sum of the unique data value count values divided by the overflow count value; and
   comparing the computed rarity value to a value of a rare value threshold,
   wherein the computed rarity value less than the rare value threshold results in a determination that rare visible values occurred for the variable.

32. The computer-program product of claim 27, further comprising, when the variable is determined to be the high cardinality variable and the fixed variable type and when the determination is that rare visible values did not occur for the variable, instructions configured to cause the data processing apparatus to:
   receive a new value for the high cardinality threshold;

determine that the variable is the high cardinality variable when the number of the plurality of unique data values is greater than the new value for the high cardinality threshold; and when the variable is not determined to be the high cardinality variable, assign the class variable role to the variable.

33. The computer-program product of claim 32, wherein comparing the overflow count value to the unique data value count values comprises:

computing a rarity value as a sum of the unique data value count values divided by the overflow count value; and comparing the computed rarity value to a value of a rare value threshold, wherein the computed rarity value less than the rare value threshold results in a determination that rare visible values occurred for the variable.

* * * * *